(12) United States Patent
Sasaki et al.

(10) Patent No.: US 7,853,422 B2
(45) Date of Patent: Dec. 14, 2010

(54) DYNAMIC-MODE ATOMIC-FORCE-MICROSCOPE PROBE (TIP) VIBRATION SIMULATION METHOD, PROGRAM, RECORDING MEDIUM, AND VIBRATION SIMULATOR

(75) Inventors: Naruo Sasaki, Tokyo (JP); Tadataka Takahashi, Tokyo (JP)

(73) Assignee: Japan Science and Technology Agency, Saitama (JP)

( * ) Notice: Subject to any disclaimer, the term of this patent is extended or adjusted under 35 U.S.C. 154(b) by 327 days.

(21) Appl. No.: 11/667,105

(22) PCT Filed: Oct. 31, 2005

(86) PCT No.: PCT/JP2005/019985
§ 371 (c)(1),
(2), (4) Date: Mar. 21, 2008

(87) PCT Pub. No.: WO2006/049120
PCT Pub. Date: May 11, 2006

(65) Prior Publication Data
US 2008/0288186 A1    Nov. 20, 2008

(30) Foreign Application Priority Data
Nov. 5, 2004    (JP) .............................. 2004-321591

(51) Int. Cl.
*G01C 17/38*    (2006.01)
*G01B 5/28*    (2006.01)

(52) U.S. Cl. ......................................... 702/94; 73/105

(58) Field of Classification Search .................. 702/85, 702/94, 95, 97, 105, 149, 150, 166, 168, 702/183; 73/105; 850/1, 2, 3, 23, 24, 25, 850/33

See application file for complete search history.

(56) References Cited

U.S. PATENT DOCUMENTS 5,503,010 A * 4/1996 Yamanaka ................... 73/105

FOREIGN PATENT DOCUMENTS

JP    06-117844 A    4/1994

(Continued)

OTHER PUBLICATIONS

PCT-Notification of Transmittal of copies of Translation of the International Preliminary Report on Patentability; International Application No. PCT/JP2005/019985; International filing Date Oct. 31, 2005.

(Continued)

*Primary Examiner*—Aditya Bhat
(74) *Attorney, Agent, or Firm*—Rader, Fishman & Grauer, PLLC

(57)    ABSTRACT

The vibration characteristic of a dynamic AFM probe is simulated. For a given operation parameter (for example, the displacement u0 of the probe, the spring constant k of the cantilever, or the radius of curvature of the probe R1), the plate-spring cantilever to which the probe is attached is vertically moved while being mechanically resonated, and the vibration characteristic of the probe of the dynamic mode atomic force microscope (AFM) for observing the structure of the sample surface is simulated. The vibration information on the probe in the steady state at each initial position u0 (displacement u–time τ) (S103, S104) is recorded, and the movement of the probe is visualized by GUI on the basis of the recorded vibration information. An essential spectroscopy obtained by the AFM, for example the amplitute a–probe initial position u0 relation or the interaction force F–probe initial position u0 relation is determined and shown on a graph according to the approach/separation of the probe (cantilever) to/from the surface.

21 Claims, 18 Drawing Sheets

FOREIGN PATENT DOCUMENTS

| | | |
|---|---|---|
| JP | 08-035831 A | 2/1996 |
| JP | 10-293135 A | 11/1998 |
| JP | 2000-028624 A | 1/2000 |
| JP | 2002-181687 A | 6/2002 |
| JP | 2003-065931 A | 3/2003 |
| JP | 2003-065935 A | 3/2003 |
| JP | 2005-069851 A | 3/2005 |
| WO | WO 02/25246 A1 | 3/2002 |
| WO | WO 2006/049120 A1 | 5/2006 |

OTHER PUBLICATIONS

Brian A. Todd et al., "Improved analysis of the time domain response of scanning force microscope cantilevers," Journal of Applied Physics, vol. 88, No. 12, pp. 7321-7327 (2000).

Naruo Sasaki et al., "New Method for Noncontact Atomic Force Microscopy Image Simulations," Japanese Journal of Applied Physics, vol. 38, pp. 192-194 (1999).

S.I. Lee et al., "Nonlinear dynamic perspectives on dynamic force microscopy," Science Direct, Ultramicroscopy 97, pp. 185-198, Elsevier Service, B.V. (2003).

Masaru Tsukada et al., "Calculation science and Nanoscience," Keisan Kagaku Kenkyu Center Symposium, 20 pages (2004).

Naruo Sasaki, "Genishi Kanriki Kenbikyo Simulator—Nano Rikigaku No Hyoka Tool," Materials Science and Technology, vol. 41, No. 5, pp. 246-278 (2004).

B. Gotsmann et al., "Conservative and dissipative tip-sample interaction forces probed with dynamic AFM," Physical Review B, vol. 60, No. 15, pp. 51-61, The American Physical Society (1999).

J. Tobik et al., "Simulation of tip-surface interactions in atomic force microscopy of an InP(110) surface with a Si tip," Physical Review B, vol. 60, No. 16, pp. 639-644, The American Physical Society (1999).

Naruo Sasaki et al., "Atomic-scale friction image of graphite in atomic-force microscopy," Physical Review B, vol. 54, No. 3, pp. 2138-2149, The American Physical Society (1996).

Michel Gauthier et al., "Interplay between Nonlinearity, Scan Speed, Damping, and Electronics in Frequency Modulation Atomic-Force Microscopy," Physical Review Letters, vol. 89, No. 14, pp. 146104-1-4, The American Physical Society (2002).

Masaru Tsukada et al., "Hisesshoku Genshi Kanryoku Kenbikyo no Riron," Solid State Physics, vol. 38, No. 4, pp. 257-268 & 300, Agune Technology Center (2003).

B. Anczykowski et al., "Cantilever dynamics in quasinoncontact force microscopy: Spectroscopic aspects," Physical Review B, vol. 53, No. 23, pp. 15 485-488, The American Physical Society (1996).

N. Sasaki et al., "Dynamics of the cantilever in noncontact atomic force microscopy," Appl. Phys. A, 66, pp. S287-S291, Materials Science & Processing, Springer-Verlag (1998).

Naruo Sasaki et al., "The Relation between Resonance Curves and Tip-surface Interaction Potential in Noncontact Atomic-Force Microscopy," Japanese Journal of Applied Physics, vol. 37, pp. L533-L535, Publication Board, Japanese Journal of Applied Physics (1998).

N. Sasaki et al., "Theoretical evaluation of the frequency shift and dissipated power in noncontact atomic force microscopy," Appl. Phys. A 72 (Suppl.) pp. S39-S42 (2001).

N. Sasaki et al., "Theory for the effect of the tip-surface interaction potential on atomic resolution in forced vibration system of noncontact AFM," Applied Surface Science, vol. 140, pp. 339-344, Elsevier Science B.V. (1999).

International Search Report.

* cited by examiner

FIG. 2
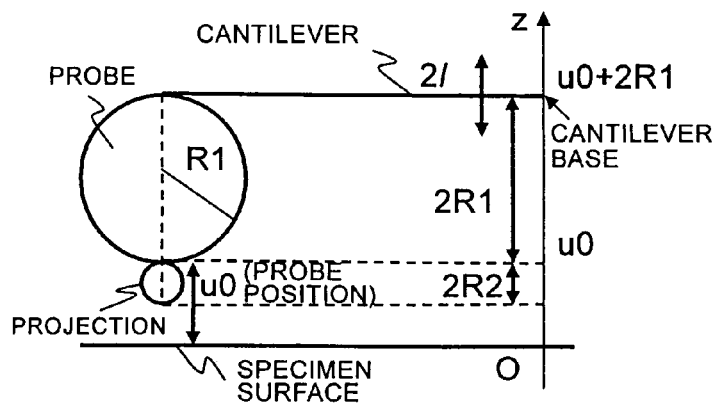
FIG. 2A
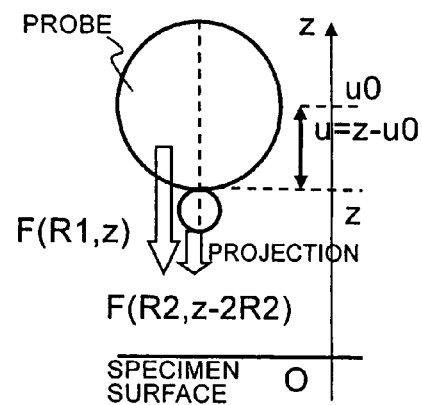
FIG. 2B
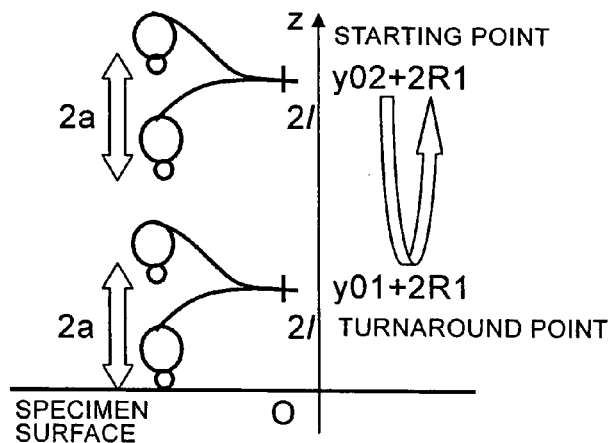
FIG. 2C

| PARAMETER | SYMBOL | VALUE |
|---|---|---|
| VARIABLES | | |
| PROBE DISPLACEMENT [nm] | u | OBTAINED BY CALCULATION |
| TIME | $\tau$ | |
| PARAMETERS THAT MUST BE INPUT | | |
| PROBE TIP POSITION<br>    WHEN CANTILEVER IS NOT DEFORMED [nm]<br>    PROBE STARTING POSITION<br>    PROBE TURNAROUND POSITION | $(u0)$<br>$y02$<br>$y01$ | $u0 > 2R2$<br><br>INPUT AND SPECIFIED |
| CANTILEVER SPRING CONSTANT [N/m] | K | |
| PROBE CURVATURE RADIUS [nm] | R1 | |
| CURVATURE RADIUS OF PROJECTION ADHERING TO PROBE TIP [nm] | R2 | |
| STEADY-STATE SAMPLING START TIME | — | |
| CONSTANTS | | |
| Q VALUE OF CANTILEVER | Q | 5 |
| EXCITED AMPLITUDE OF CANTILEVER [nm] | $l$ | 0.5 |
| ATOM NUMBER DENSITY IN PROBE AND SURFACE [nm$^3$] | $\rho$ | 0.25 |
| PARAMETER RELATED TO ATOM RADIUS [nm] | $\sigma$ | 0.25 |
| PARAMETER RELATED TO ENERGY [eV] | $\varepsilon$ | 0.01 |

FIG. 3

FIG. 10
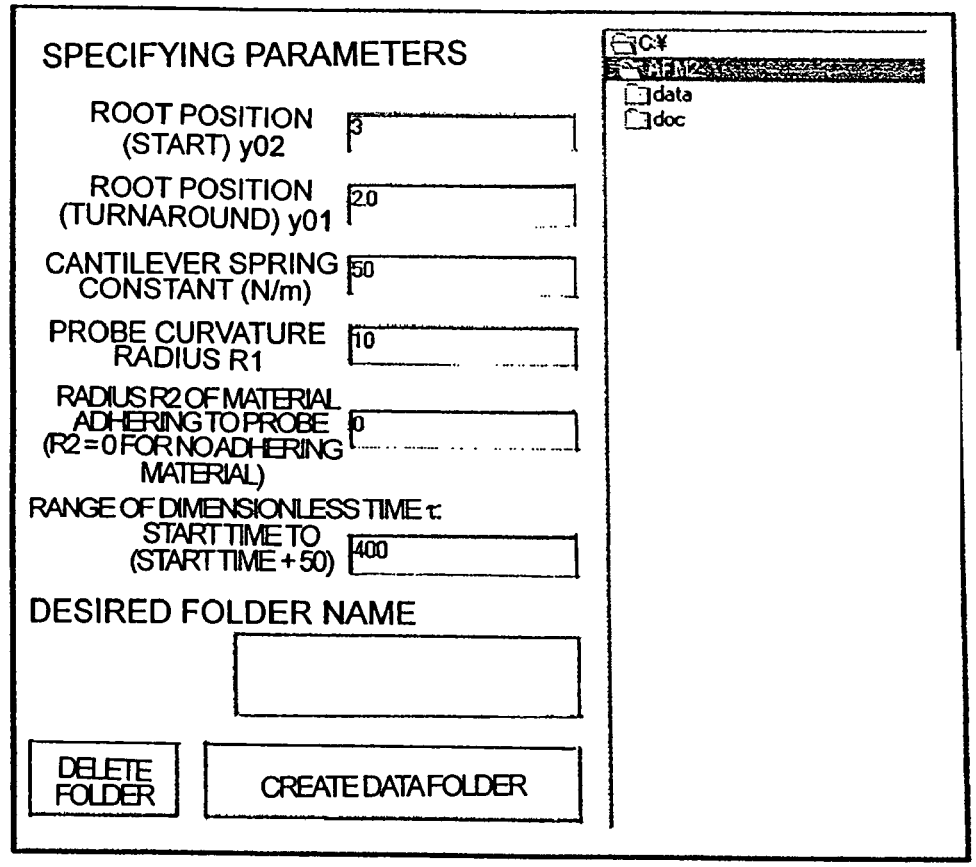
SPECIFYING PARAMETERS
FIG. 10A
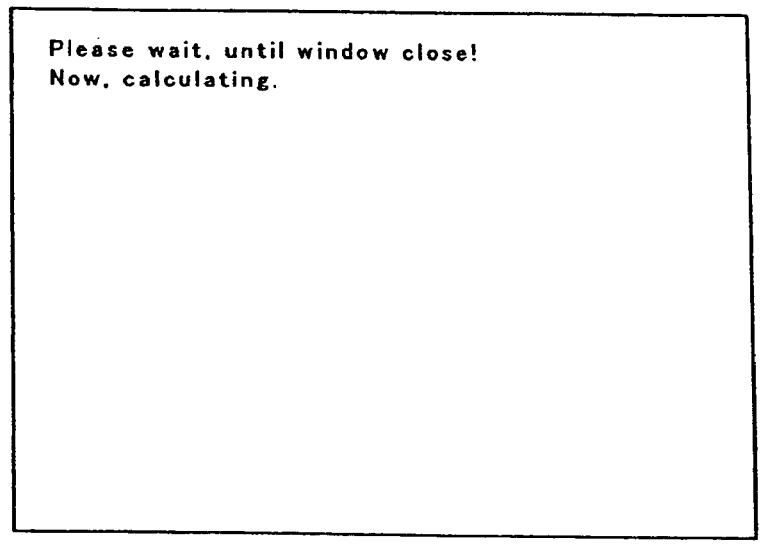
DOS PROMPT
FIG. 10B

WHEN PROBE IS FAR FROM SURFACE (NON-CONTACT STATE)

WHEN PROBE IS APPROACHING SURFACE (NON-CONTACT STATE)

WHEN PROBE IS IN CONTACT WITH SURFACE (HIT)

OUTPUT FILE LIST

SPECTROSCOPY OF AMPLITUDE OBTAINED
WHEN RENDERING AMPLITUDE "a" AS FUNCTION OF PROBE POSITION "u0"

FIG. 16
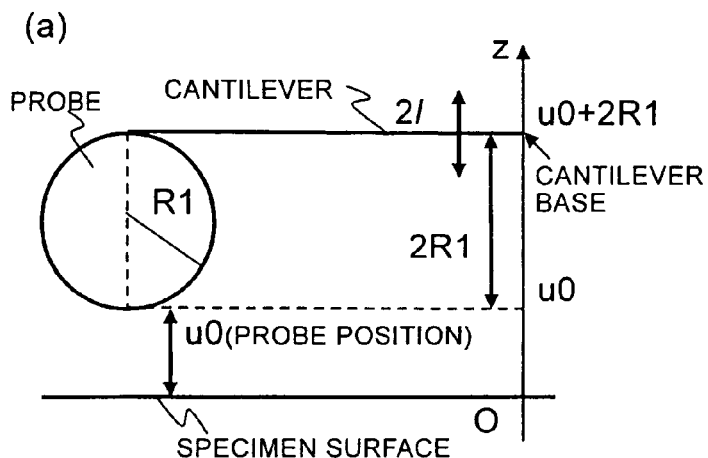
FIG. 16A
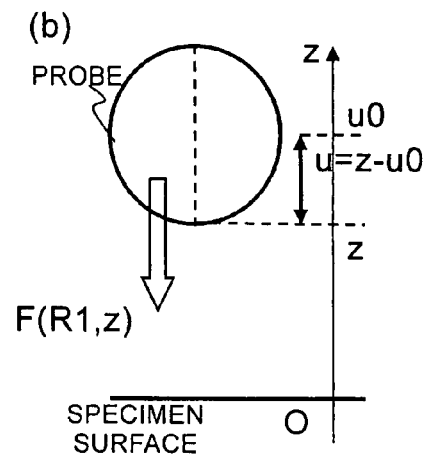
FIG. 16B
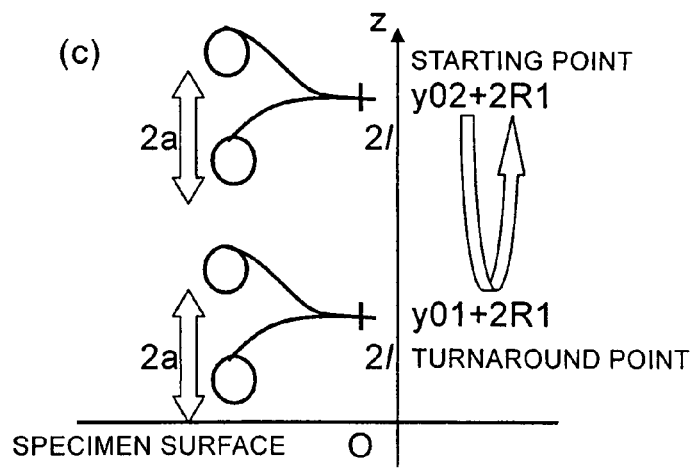
FIG. 16C

FIG. 17
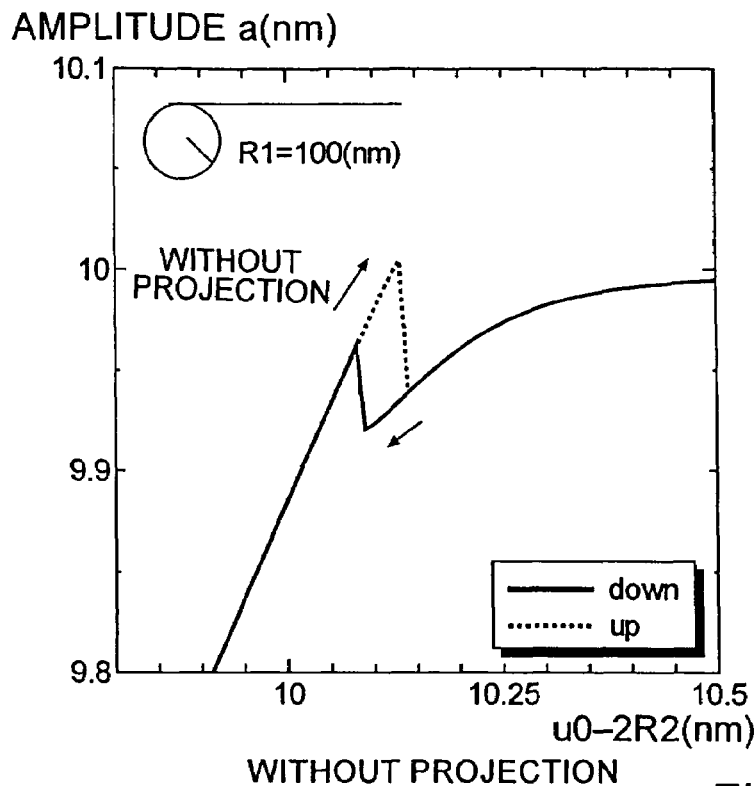
WITHOUT PROJECTION
FIG. 17A
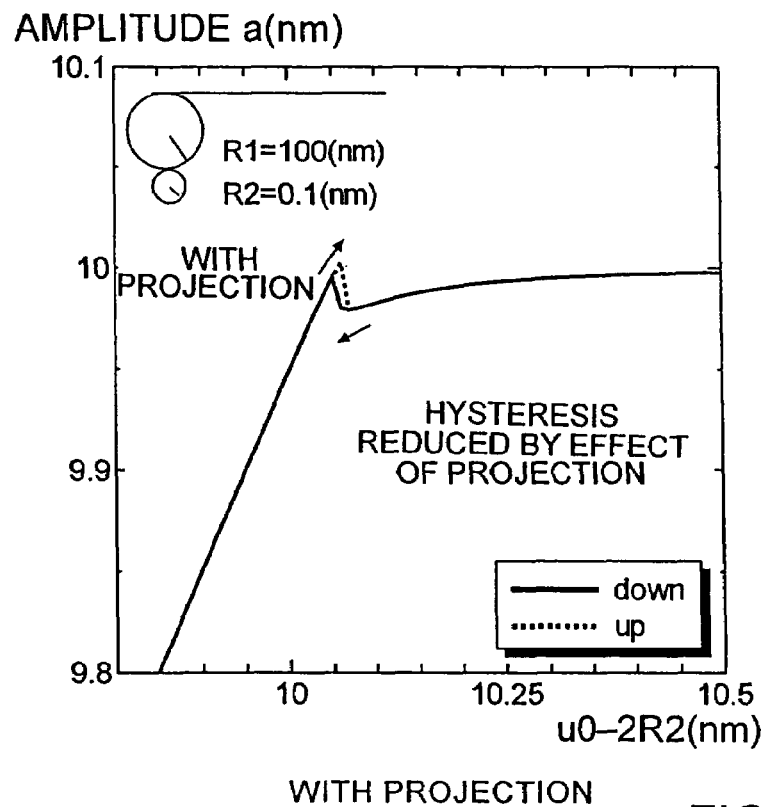
WITH PROJECTION
FIG. 17B

DYNAMIC-MODE ATOMIC-FORCE-MICROSCOPE PROBE (TIP) VIBRATION SIMULATION METHOD, PROGRAM, RECORDING MEDIUM, AND VIBRATION SIMULATOR

FIELD OF THE INVENTION

The present invention relates to dynamic-mode atomic-force-microscope probe (tip) vibration simulation methods, simulation programs, recording media having recorded simulation programs, and dynamic-mode atomic-force-microscope probe vibration simulators, and more specifically, to a dynamic-mode atomic-force-microscope probe vibration simulation method and program for supporting nano-scale nonlinear vibration analysis among scanning probe microscope simulator techniques, which are promising measuring methods in nanotechnology, a recording medium having recorded the program, and a dynamic-mode atomic-force-microscope probe vibration simulator.

BACKGROUND OF THE INVENTION

A dynamic-mode atomic force microscope (dynamic AFM, dynamic atomic force microscope) is a probe microscope for observing the structure of a surface on micro-scale to nano-scale by mechanically vibrating, in resonation, a plate spring, referred to as a cantilever, having a probe at its end. Because the interaction forces acting between the probe and the surface are nonlinear, it is often hard to understand the physical meaning of a change in measured amplitude or a frequency shift. This tendency becomes eminent when the probe hits the surface.

Conventionally, the dynamics of the probe (or cantilever) of the dynamic AFM is simulated to explain the results of AFM measurement performed by an experiment group. The equation of motion of the probe is solved numerically and compared with spectroscopy of an amplitude "a" or a trajectory in the phase space to obtain theoretical interpretations (refer to non-patent documents 1 and 2, for instance). Non-patent document 1 shows the spectroscopy of an amplitude "a" in FIG. 2, and non-patent document 2 shows the relationship between a displacement "u" and a time derivative $du/d\tau$ in FIG. 2.

Non-patent document 1: B. Anczykowski, D. Kruger, and H. Fuchs, Phys. Rev. B53, 15485-15488, 1996 Non-patent document 2: N. Sasaki, et al., Appl. Phys. A66, S287-291, 1998.

DISCLOSURE OF INVENTION

Problems to be Solved

The present invention considers the dynamics of the probe. Because the probe is disposed at an end of the cantilever, as will be described later, the dynamics of the probe is essentially equivalent to the dynamics of the cantilever. In this description, the expression "the dynamics of the probe" is used.

The dynamics of the probe has been discussed in the range of limited parameters, but a minute change in a parameter may provide a very remarkable change in the dynamics of the cantilever and may cause the operation to become unstable. This is because the nonlinearity of the interaction force acting between the probe and the surface causes a history structure like hysteresis to appear. The parameters here include, for instance, the amplitude "a" of vibration of the cantilever, the initial position "u0" of the probe, the excited frequency "Q" and the excited amplitude "1" of the base of the cantilever, the Q value, the spring constant "k", the curvature radius "R" of the probe, and the interaction force between the probe and the surface.

Therefore, it is necessary to find a parameter range (the cantilever vibration amplitude "a", the initial probe position "u0", the excited frequency "Q" and the excited amplitude "1" of the base of the cantilever, the Q value, the spring constant "k", the probe curvature radius "R", the interaction forces between the probe and the surface, and the like) for controlling the dynamic AFM with stability and obtaining an optimum resolution. It is difficult to organize the amount of data of enormous parameters systematically and efficiently.

In view of the above, it is an object of the present invention to simulate the vibration characteristics of the probe of a dynamic AFM with respect to a given operating parameter and to analyze the vibration characteristics with respect to a given group of parameters. More specifically, one object of the present invention is to simulate and analyze the vibration characteristics of the probe of the dynamic AFM with respect to the operating parameters of the initial probe position "u0", the cantilever spring constant "k", and the probe curvature radius "R". Another object of the present invention is to provide a means for analyzing the vibration characteristics systematically and efficiently with respect to a wide range of parameters. A further object of the present invention is to provide nano-scale nonlinear vibration analysis support software for simulating and analyzing nonlinear vibration occurring at a hit efficiently.

The inventor is the first one who has noticed the importance of the projection (protrusion) effects of the tip of the probe in lever vibration of a dynamic-mode AFM, and an object of the present invention is to provide a simulator based on this idea.

The projection effects of the tip of the probe include the following:

[a] The tip of the probe has bumps and dips in the order of nanometers. One object of the present invention is to allow the effect of the bumps and dips to be idealized at a projection and discussed.

[b] When the probe hits the surface of a specimen, an atom of the surface may adhere to the tip of the probe. There also may be an atom or molecule originally adhering to the tip of the probe. One object of the present invention is to allow the adhering atom or molecule to be idealized by a projection and discussed.

One object of the present invention is to discuss the size effects of the projection of the tip of the probe of [a] and [b] above and to provide a simulator for allowing discussion of the size effects of the probe itself.

Another object of the present invention is to provide a support tool to make it easy for the user to understand, see, and interpret nonlinear vibration by providing a display block to show a general view of the cantilever, the probe, and the surface in a left area, a magnified view of the probe and the surface in a center area, the lever vibration waveform in a top right area, and the trajectory of the probe vibration in a bottom right area, for instance (see FIGS. 11 to 13).

The present invention also has the following objects:

(1) To provide a simulator specializing in analyzing a nano-size nonlinear movement of the probe of the dynamic AFM. More specifically, the vibration analysis of the probe of the dynamic AFM, ranging from simulation of experimental cantilever operation to vibration characteristics analysis, is conducted on a personal computer systematically and efficiently. For that purpose, a nano-size AFM nonlinear vibration simulator and analysis support software are provided;

(2) To analyze the size of the probe of the dynamic AFM and the size effects of the projection structure of the tip of the probe when curvature radii R1 and R2 are provided;

(3) To aid in the visual understanding of the characteristics of the nonlinear vibration by allowing a desired data combination of probe vibration (u–t relationship) to be taken from a given parameter area and to be visualized in animated video (animated simulation). More specifically, the interaction forces (an attractive force and a repulsive force) between the tip of the probe and the surface of the specimen are shown to distinguish whether the probe is in contact with the surface or not. The hit is visualized in nano-scale;

(4) To organize efficiently and analyze nonlinear characteristics data of the AFM in the given parameter area. Accordingly, one object is to present a theoretically optimum parameter set for operating the dynamic AFM. Many types of spectrum information such as amplitude "a"—probe position "u0" and energy "E"—probe position "u0"—are graphically expressed;

(5) To provide an extensible simulator that allows a given parameter to be included in calculation;

(6) To provide a simulator that makes it easy to draw an image by using given freeware or shareware.

Accordingly, an object of the present invention is to provide a simulator that allows research of simulation and analysis of the relationship between nano-scale nonlinear vibration and a nano structure, which was hard to analyze, to be conducted and that is expected to become an important basic technology in a mechanical probe analysis method.

Means to Solve the Problems

The present invention performs simulation with respect to given operating parameters (u0, k, R) and then visualize the motion of the probe with respect to the specific parameters (u0, k, R) by, selecting and executing a file recording the steady-state vibration information of the probe at each initial position "u0" (displacement "u"–time "τ") from a file list displayed by a graphic user interface (GUI). At the instant when the visual information is displayed, the user can understand and interpret the vibration characteristics. The major spectroscopy obtained by the AFM (such as the relationship between the amplitude "a" and the initial probe position "u0" and the relationship between the interaction force "F" and the initial probe position "u0") is graphed in relation to motion to bring the probe (cantilever) closer to the surface and to withdraw the probe.

According to first solving means of the present invention, there is provided a dynamic-mode atomic-force-microscope probe vibration simulation method for simulating vibration characteristics of a probe of a dynamic-mode atomic force microscope for observing the structure of a surface of a specimen by bringing a cantilever having a probe with a projection at the cantilever end closer to and/or far from the surface of the specimen while producing resonance mechanically, the dynamic-mode atomic-force-microscope probe vibration simulation method comprising:

a step in which a processing block inputs a starting position and a turnaround position of the approach and/or leaving of the cantilever, the curvature radius of the probe, the curvature radius of the projection of the probe, and the spring constant of the cantilever, from an input block;

a step in which the processing block specifies an initial displacement with respect to an initial probe position and an initial probe velocity;

a step in which the processing block sets the initial probe position to the input starting position;

a step in which the processing block solves the following equation of motion of the probe when the non-probe side of the cantilever is vibrated, in accordance with the set initial probe position, the specified probe displacement, the specified initial velocity, and the input probe curvature radius, the input projection curvature radius, and the input cantilever spring constant, to obtain the probe displacement and the probe velocity at each time;

[Mathematical expression 1]

$$\ddot{u} + \frac{1}{Q}\dot{u} + u - \frac{1}{k}F(R1, u+u0) - \frac{1}{k}F(R2, u+u0-2R2) = l\cos\tau \quad (1)$$

$$F(R, z) = \frac{2}{3}\pi^2\rho^2\varepsilon\sigma^4 R\left[\frac{1}{30}\left(\frac{\sigma}{z}\right)^8 - \left(\frac{\sigma}{z}\right)^2\right] \quad (2)$$

[where "u" is the displacement of the probe from the initial probe position "u0" when the cantilever is not expanding nor contracting; "τ" is a time; "z" is the probe position z(τ) at the time "τ"; F(R, z) is the van der Waals force or interaction force acting on the projection or the tip of the spherical probe having the curvature radius "R"; "Q" is the Q value of the cantilever; "k" is the spring constant; "l" is the excited amplitude; "ρ" is the atom number density in the probe and the surface; "σ" is a parameter related to the radius of an atom; "ε" is a parameter related to the binding energy of the atom; "R1" is the curvature radius of the probe; "R2" is the curvature radius of the projection; and "u0" is the initial probe position]

a step in which the processing block stores the obtained probe displacement and time corresponding with each other in a storage block with respect to the initial probe position and stores the probe velocity and time corresponding with each other in the storage block with respect to the initial probe position;

a step in which the processing block sets an initial probe displacement and an initial probe velocity in subsequent repeated processing to the values of the probe displacement and the probe velocity obtained at the last time in the step in which the processing block solves the equation of motion to obtain the probe displacement and the probe velocity or to values at a predetermined time; and a step in which, until the value of the set initial probe position becomes smaller than or equal to the value of the input turnaround position or smaller than the value of the input turnaround position, the processing block repeatedly (a) specifies a new initial probe position by subtracting a predetermined cantilever movement increment from the input starting position successively or subtracting the movement increment from the set initial probe position and (b) executes the steps from the step in which the processing block solves the equation of motion to obtain the probe displacement and the probe velocity to the step in which the processing block sets an initial probe displacement and an initial probe velocity to the values at the last time or at a predetermined time, with respect to the newly specified initial probe position, and there are provided a dynamic-mode atomic-force-microscope probe vibration simulation program for simulating vibration characteristics of a dynamic-mode atomic force microscope for observing the structure of a surface of a specimen by bringing a cantilever having a probe at the cantilever end closer to and/or far from the surface of the specimen while producing resonance mechanically, which makes a computer execute each of the above-described steps, and a computer-readable recording medium having the program stored thereon.

According to second solving means of the present invention, there is provided a dynamic-mode atomic-force-microscope probe vibration simulation method for simulating vibration characteristics of a probe of a dynamic-mode atomic force microscope for observing the structure of a surface of a specimen by bringing a cantilever having a probe at the cantilever end closer to and/or far from the surface of the specimen while producing resonance mechanically, the dynamic-mode atomic-force-microscope probe vibration simulation method comprising:

a step in which a processing block inputs a starting position and a turnaround position of the approach and/or leaving of the cantilever, the curvature radius of the probe, and the spring constant of the cantilever, from an input block;

a step in which the processing block specifies an initial displacement with respect to an initial probe position and an initial probe velocity;

a step in which the processing block sets the initial probe position to the input starting position;

a step in which the processing block solves the following equation of motion of the probe when the non-probe side of the cantilever is vibrated, in accordance with the set initial probe position, the specified probe displacement, the specified initial velocity, and the input probe curvature radius, and the input cantilever spring constant, to obtain the probe displacement and the probe velocity at each time;

[Mathematical expression 2]

$$\ddot{u} + \frac{1}{Q}\dot{u} + u - \frac{1}{k}F(R1, u + u0) = l\cos\tau \quad (11)$$

$$F(R, z) = \frac{2}{3}\pi^2\rho^2\varepsilon\sigma^4 R\left[\frac{1}{30}\left(\frac{\sigma}{z}\right)^8 - \left(\frac{\sigma}{z}\right)^2\right] \quad (12)$$

[where "u" is the displacement of the probe from the initial probe position "u0" when the cantilever is not expanding nor contracting; "τ" is a time; "z" is the probe position z(τ) at the time "τ"; F(R, z) is the van der Waals force acting on the tip of the spherical probe having the curvature radius "R"; "Q" is the Q value of the cantilever; "k" is the spring constant; "l" is the excited amplitude; "ρ" is the atom number density in the probe and the surface; "σ" is a parameter related to the radius of an atom; "ε" is a parameter related to the binding energy of the atom; "R1" is the curvature radius of the probe; and "u0" is the initial probe position]

a step in which the processing block stores the obtained probe displacement and time corresponding with each other in a storage block with respect to the initial probe position and stores the probe velocity and time corresponding with each other in the storage block with respect to the initial probe position;

a step in which the processing block sets an initial probe displacement and an initial probe velocity in subsequent repeated processing to the values of the probe displacement and the probe velocity obtained at the last time in the step in which the processing block solves the equation of motion to obtain the probe displacement and the probe velocity or to values at a predetermined time; and a step in which, until the value of the set initial probe position becomes smaller than or equal to the value of the input turnaround position or smaller than the value of the input turnaround position, the processing block repeatedly (a) specifies a new initial probe position by subtracting a predetermined cantilever movement increment from the input starting position successively or subtracting the movement increment from the set initial probe position and (b) executes the steps from the step in which the processing block solves the equation of motion to obtain the probe displacement and the probe velocity to the step in which the processing block sets an initial probe displacement and an initial probe velocity to the values at the last time or at a predetermined time, with respect to the newly specified initial probe position, and there are provided a dynamic-mode atomic-force-microscope probe vibration simulation program for simulating vibration characteristics of a dynamic-mode atomic force microscope for observing the structure of a surface of a specimen by bringing a cantilever having a probe at the cantilever end closer to and/or far from the surface of the specimen while producing resonance mechanically, which makes a computer execute each of the above-described steps, and a computer-readable recording medium having the program stored thereon.

According to third solving means of the present invention, there is provided a dynamic-mode atomic-force-microscope probe vibration simulator for simulating vibration characteristics of a dynamic-mode atomic force microscope for observing the structure of a surface of a specimen by bringing a cantilever having a probe with a projection at the cantilever end closer to and/or far from the surface of the specimen while producing resonance mechanically, the dynamic-mode atomic-force-microscope probe vibration simulator comprising:

an input block for inputting parameters;

a processing block for simulating vibration characteristics of a dynamic-mode atomic force microscope in accordance with the parameters which are input from the input block; and, a storage or output block for storing or displaying data obtained by the processing block, wherein the processing block has a means for inputting a starting position and a turnaround position of the approach and/or leaving of the cantilever, the curvature radius of the probe, the curvature radius of the projection of the probe, and the spring constant of the cantilever, from the input block;

a means for specifying an initial displacement with respect to an initial probe position and an initial probe velocity;

a means for setting the initial probe position to the input starting position;

a means for solving the following equation of motion of the probe when the non-probe side of the cantilever is vibrated, in accordance with the set initial probe position, the specified probe displacement, the specified initial velocity, and the input probe curvature radius, the input projection curvature radius, and the input cantilever spring constant, to obtain the probe displacement and the probe velocity at each time;

[Mathematical expression 3]

$$\ddot{u} + \frac{1}{Q}\dot{u} + u - \frac{1}{k}F(R1, u + u0) - \frac{1}{k}F(R2, u + u0 - 2R2) = l\cos\tau \quad (1)$$

$$F(R, z) = \frac{2}{3}\pi^2\rho^2\varepsilon\sigma^4 R\left[\frac{1}{30}\left(\frac{\sigma}{z}\right)^8 - \left(\frac{\sigma}{z}\right)^2\right] \quad (2)$$

[where "u" is the displacement of the probe from the initial probe position "u0" when the cantilever is not expanding nor contracting; "τ" is a time; "z" is the probe position z(τ) at the time "τ"; F(R, z) is the van der Waals force or interaction force acting on the projection or the tip of the spherical probe having the curvature radius "R"; "Q" is the Q value of the cantilever; "k" is the spring constant; "l" is the excited amplitude; "ρ" is the atom number density in the probe and the surface; "σ" is a parameter related to the radius of an atom; "ε" is a parameter related to the binding energy of the atom; "R1" is the curvature radius of the probe; "R2" is the curvature radius of the projection; and "u0" is the initial probe position]

a means for storing the obtained probe displacement and time corresponding with each other in the storage or output block with respect to the initial probe position and storing the probe velocity and time corresponding with each other in the storage or output block with respect to the initial probe position;

a means for setting an initial probe displacement and an initial probe velocity in subsequent repeated processing to the values of the probe displacement and the probe velocity obtained at the last time in the means for solving the equation of motion to obtain the probe displacement and the probe velocity or to values at a predetermined time; and a means for, until the value of the set initial probe position becomes smaller than or equal to the value of the input turn-around position or smaller than the value of the input turn-around position, repeatedly (a) specifying a new initial probe position by subtracting a predetermined cantilever movement increment from the input starting position successively or subtracting the movement increment from the set initial probe position and (b) executes the means from the means for solving the equation of motion to obtain the probe displacement and the probe velocity to the means for setting an initial probe displacement and an initial probe velocity to the values at the last time or at a predetermined time, with respect to the newly specified initial probe position.

According to fourth solving means of the present invention, there is provided a dynamic-mode atomic-force-microscope probe vibration simulator for simulating vibration characteristics of a dynamic-mode atomic force microscope for observing the structure of a surface of a specimen by bringing a cantilever having a probe at the cantilever end closer to and/or far from the surface of the specimen while producing resonance mechanically, the dynamic-mode atomic-force-microscope probe vibration simulator comprising:

an input block for inputting parameters;

a processing block for simulating vibration characteristics of a dynamic-mode atomic force microscope in accordance with the parameters which are input from the input block; and, a storage or output block for storing or displaying data obtained by the processing block, wherein the processing block has a means for inputting a starting position and a turnaround position of the approach and/or leaving of the cantilever, the curvature radius of the probe, and the spring constant of the cantilever, from the input block;

a step means for specifying an initial displacement with respect to an initial probe position and an initial probe velocity;

a step means for setting the initial probe position to the input starting position;

a step means for solving the following equation of motion of the probe when the non-probe side of the cantilever is vibrated, in accordance with the set initial probe position, the specified probe displacement, the specified initial velocity, and the input probe curvature radius, and the input cantilever spring constant, to obtain the probe displacement and the probe velocity at each time;

[Mathematical expression 4]

$$\ddot{u} + \frac{1}{Q}\dot{u} + u - \frac{1}{k}F(R1, u + u0) = l\cos\tau \tag{11}$$

$$F(R, z) = \frac{2}{3}\pi^2\rho^2\varepsilon\sigma^4 R\left[\frac{1}{30}\left(\frac{\sigma}{z}\right)^8 - \left(\frac{\sigma}{z}\right)^2\right] \tag{12}$$

[where "u" is the displacement of the probe from the initial probe position "u0" when the cantilever is not expanding nor contracting; "τ" is a time; "z" is the probe position z(τ) at the time "τ"; F(R, z) is the van der Waals force acting on the tip of the spherical probe having the curvature radius "R"; "Q" is the Q value of the cantilever; "k" is the spring constant; "l" is the excited amplitude; "ρ" is the atom number density in the probe and the surface; "σ" of is a parameter related to the radius of an atom; "ε" is a parameter related to the binding energy of the atom; "R1" is the curvature radius of the probe; and "u0" is the initial probe position]

a means for storing the obtained probe displacement and time corresponding with each other in the storage or output block with respect to the initial probe position and storing the probe velocity and time corresponding with each other in the storage or output block with respect to the initial probe position;

a means for setting an initial probe displacement and an initial probe velocity in subsequent repeated processing to the values of the probe displacement and the probe velocity obtained at the last time in the means for solving the equation of motion to obtain the probe displacement and the probe velocity or to values at a predetermined time; and a means for, until the value of the set initial probe position becomes smaller than or equal to the value of the input turn-around position or smaller than the value of the input turn-around position, repeatedly (a) specifying a new initial probe position by subtracting a predetermined cantilever movement increment from the input starting position successively or subtracting the movement increment from the set initial probe position and (b) executes the means from the means for solving the equation of motion to obtain the probe displacement and the probe velocity to the means for setting an initial probe displacement and an initial probe velocity to the values at the last time or at a predetermined time, with respect to the newly specified initial probe position.

Advantage

According to the present invention, it can simulate the vibration characteristics of the probe of a dynamic AFM with respect to a given operating parameter and analyze the vibration characteristics with respect to a given group of parameters. More specifically, according to the present invention, it can simulate and analyze the vibration characteristics of the probe of the dynamic AFM with respect to the operating parameters of the initial probe position "u0", the cantilever spring constant "k", and the probe curvature radius "R". According to the present invention, it can provide a means for analyzing the vibration characteristics systematically and efficiently with respect to a wide range of parameters. According to the present invention, it can provide nano-scale nonlinear vibration analysis support software for simulating and analyzing nonlinear vibration occurring at a hit efficiently.

The inventor is the first one who has noticed the importance of the projection effects of the tip of the probe in lever vibration of a dynamic-mode AFM, and according to the present invention, it can provide a simulator based on this idea.

The projection effects of the tip of the probe include the following:

[a] The tip of the probe has bumps and dips in the order of nanometers. According to the present invention, it can allow the effect of the bumps and dips to be idealized at a projection and discussed.

[b] When the probe hits the surface of a specimen, an atom of the surface may adhere to the tip of the probe. There also may be an atom or molecule originally adhering to the tip of the probe. According to the present invention, it can allow the adhering atom or molecule to be idealized by a projection and discussed.

According to the present invention, it can provide a simulator for allowing to discuss the size effects of the projection of the tip of the probe of [a] and [b] above and to discuss the size effects of the probe itself.

According to the present invention, it can provide a support tool to make it easy for the user to understand, see, and interpret nonlinear vibration by providing a display block to show a general view of the cantilever, the probe, and the surface in a left area, a magnified view of the probe and the surface in a center area, the lever vibration waveform in a top right area, and the trajectory of the probe vibration in a bottom right area, for instance (see FIGS. 11 to 13).

The present invention also has the following effects that:

(1) It can provide a simulator specializing in analyzing a nano-size nonlinear movement of the probe of the dynamic AFM. More specifically, the vibration analysis of the probe of the dynamic AFM, ranging from simulation of experimental cantilever operation to vibration characteristics analysis, is conducted on a personal computer systematically and efficiently. For that purpose, a nano-size AFM nonlinear vibration simulator and analysis support software are provided;

(2) It can analyze the size of the probe of the dynamic AFM and the size effects of the projection structure of the tip of the probe when curvature radii R1 and R2 are provided;

(3) It can aid in the visual understanding of the characteristics of the nonlinear vibration by allowing a desired data combination of probe vibration (u–t relationship) to be taken from a given parameter area and to be visualized in animated video. More specifically, the interaction forces (an attractive force and a repulsive force) between the tip of the probe and the surface of the specimen are shown to distinguish whether the probe is in contact with the surface or not. The hit is visualized in nano-scale;

(4) It can organize efficiently and analyze nonlinear characteristics data of the AFM in the given parameter area. Accordingly, it can present a theoretically optimum parameter set for operating the dynamic AFM. Many types of spectrum information such as amplitude "a"—probe position "u0" and energy "E"—probe position "u0" are graphically expressed;

(5) It can provide an extensible simulator that allows a given parameter to be included in calculation;

(6) It can provide a simulator that makes it easy to draw an image by using given freeware or shareware.

Accordingly, the present invention can provide a simulator that allows research of simulation and analysis of the relationship between nano-scale nonlinear vibration and a nano structure, which was hard to analyze, to be conducted and that is expected to become an important basic technology in a mechanical probe analysis method.

BRIEF DESCRIPTION OF THE DRAWINGS

FIG. 2 is a structural system diagram of the dynamic AFM.

FIG. 3 is a view listing variables and constants included in equations of the dynamic AFM system.

FIG. 10 shows an example of a parameter setting screen.

FIG. 16 is a structural system diagram of a dynamic AFM without a projection.

FIG. 17 shows examples of numerical calculation in cases where a projection is provided and a projection is not provided.

EMBODIMENT OF THE INVENTION

1. First Embodiment (Hardware Structure)

Figure 1:
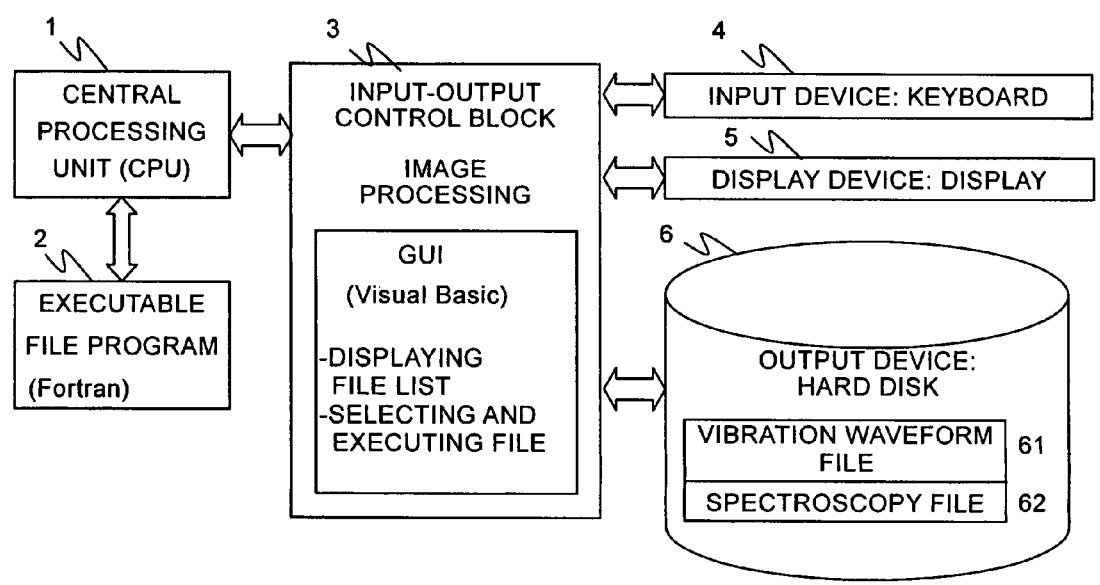
FIG. 1 is a hardware block diagram of a dynamic AFM simulator.

FIG. 1 is a block diagram showing hardware implementing a simulator environment of a first embodiment.

A dynamic AFM simulator includes, for instance, a central processing unit (CPU) 1, a memory 2 for storing an executable file program, an input-output control block 3, and an input device (input block) 4, a display device (display block) 5, and an output device (storage block, storage-or-output device) 6.

The central processing unit (CPU) 1 executes processing as programmed in the executable file program stored in the memory. The executable file program can be written in Fortran and may also be written in other languages such as C and Visual Basic (VB). The input-output control block 3 performs image processing, such as displaying a file list by GUI (VB), selecting a file, and executing a file. Besides the VB GUI, an appropriate type of GUI can be used.

As the input device 4, an appropriate type of input means such as a keyboard, a mouse, and a pointing device can be used. As the display device 5, a display can be used, for instance. As the output device 6, a storage device such as a hard disk, an interface with an external device, and the like can be used. The input device 4, the display device 5, and the output device 6 can be other appropriate means.

As shown in the figure, the central processing unit (CPU) 1 and the Fortran executable file program 2 of the dynamic AFM simulator create a vibration waveform file 61 and a spectroscopy file 62 on the AFM probe position basis as text-format output files on the hard disk 6.

The lists of the files 61 and 62 are displayed in the VB GUI environment 3. When the vibration waveform file 61 corresponding to a given probe position "u0" is selected and executed by GUI, animated video of the vibration movement of the probe is shown on the display 5. When the nonlinear vibration of the probe is analyzed, the spectroscopy file 62 is selected and executed. Then, certain rendering software is activated through GUI and a spectroscopy graph is shown on the display 5.

(Equation of Motion of the Dynamic AFM System and Parameters Used)

The equation of motion of the dynamic AFM system and the probe to be simulated by the simulator is derived as follows.

FIG. 2 is a system block diagram of the dynamic AFM. FIG. 2(*a*) is a view illustrating the positional relationship between the cantilever or probe and the surface system and the definition of the probe position "u0". FIG. 2(*b*) is a view illustrating the definition of the probe displacement "u" and the interaction forces between the probe and the surface. FIG. 2(*c*) shows the drive mode of the dynamic AFM. The dynamic AFM causes the base of the cantilever to make one round-trip between y01 +2R1 and y02 +2R1 while vibrating it with an amplitude "l".

Suppose that the system has a plate spring, referred to as a cantilever, having a probe at an end and a specimen surface, as shown in FIG. 2(*a*). The probe has a spherical shape or a pseudo-spherical shape and is given a size parameter of curvature radius "R1". In addition, a projection having a curvature radius "R2" is also supposed, so that a probe tip with a projection having a spherical or pseudo-spherical shape can be handled. This projection is one feature of the present embodiment. In the dynamic AFM, the projection can be formed by bumps and dips on the surface of the probe or can be an atom supplied by the specimen surface, for instance. The curvature radius "R2" gives a measure of the degree of bumps and dips at the tip of the probe and the size of the adhering atom.

The initial position of the probe tip when the cantilever in not expanding nor contracting is specified as "u0". Then, the base of the cantilever can be expressed as u0+2R1. When the cantilever mechanically produces resonance with an amplitude "l" centering on the base, the equation of motion of the probe can be expressed as a second-order nonlinear ordinary differential equation about time "τ".

[Mathematical expression 5]

$$\ddot{u} + \frac{1}{Q}\dot{u} + u - \frac{1}{k}F(R1, u+u0) - \frac{1}{k}F(R2, u+u0-2R2) = l\cos\tau \quad (1)$$

$$F(R, z) = \frac{2}{3}\pi^2\rho^2\varepsilon\sigma^4 R\left[\frac{1}{30}\left(\frac{\sigma}{z}\right)^8 - \left(\frac{\sigma}{z}\right)^2\right] \quad (2)$$

More specifically $$F(R1, u+u0) = \frac{2}{3}\pi^2\rho^2\varepsilon\sigma^4 R1\left[\frac{1}{30}\left(\frac{\sigma}{u+u0}\right)^8 - \left(\frac{\sigma}{u+u0}\right)^2\right]$$

$$F(R2, u+u0-2R2) =$$
$$\frac{2}{3}\pi^2\rho^2\varepsilon\sigma^4 R1\left[\frac{1}{30}\left(\frac{\sigma}{u+u0-2R2}\right)^8 - \left(\frac{\sigma}{u+u0-2R2}\right)^2\right]$$

As shown in FIG. 2(*b*), the displacement of the probe from the initial probe position "u0" when the cantilever is not expanding nor contracting is expressed as u=z−u0. FIG. 2(*b*) shows the probe moved from the initial position "u0" by the displacement "u". "z" is the probe position at time "τ", or z(τ). F(R, z) is the van der Waals force acting on the projection and the tip of the spherical probe having a curvature radius "R". As shown in FIG. 2(*b*), the sum of the force F(R1, z) (=F(R1, u+u0)) acting on the probe tip and the force F(R2, z−2R2) (=F(R2, u+u0−2R2)) acting on the tip of the projection is considered. The Q value, the spring constant, and the excited amplitude of the cantilever are expressed as "Q", "k", and "l" respectively. The atom number density in the probe and the surface, a parameter related to the atom radius, and a parameter related to the binding energy of the atom are denoted by "ρ", "σ", and "ε" respectively.

The dynamic ATM system expressed by the equation (1) operating as shown in FIG. 2(*c*) is then considered. This corresponds to the measurement of spectroscopy of amplitude "a" in an experiment. The base of the cantilever makes one round-trip between the starting point y02 +2R1 and the turnaround point y01 +2R1 while mechanically producing resonance with the excited amplitude "l".

When the amplitude "a" of the probe is numerically calculated and plotted as a function of the initial probe position "u0" (y01<u0<y02), the graph of the amplitude "a" as a function of the probe position "u0", or the spectroscopy of the amplitude is obtained. If the energy "E" of the vibration, the interaction force "F", or the interaction force energy "V" is plotted instead of the amplitude "a", the corresponding spectroscopy can be obtained.

If the probe vibration displacement "u" is plotted as a function of time "τ" with respect to the constant probe position "u0", the motion waveform can be obtained. If "u" and its time derivative are plotted, a trajectory in the phase plane can be obtained.

FIG. 3 is a view listing variables and constants included in equations of the dynamic AFM system of the present embodiment. As shown in the figure, the parameters "u" and "τ" are variables determined in the process of calculation.

"Q", "l", "ρ", "σ" and "ε" are given as constants. "Q" of 5 and "l" of 0.5 are supposed here, for instance, which correspond to a large amplitude mode in a solution. "ε" of 0.01 is supposed for instance, which corresponds to chemically inert interaction (a level producing no strong binding force between atoms).

Parameters that must be input include u0=y02 (probe starting position), u0=y01 (probe turnaround point), k (cantilever spring constant [N/m]), R1 (probe curvature radius [mm]), R2 (curvature radius of the projection adhering to the probe tip [mm]), and the steady-state sampling start time. Details of input will be described later.

(Structure of Output Data File)

Figure 4:
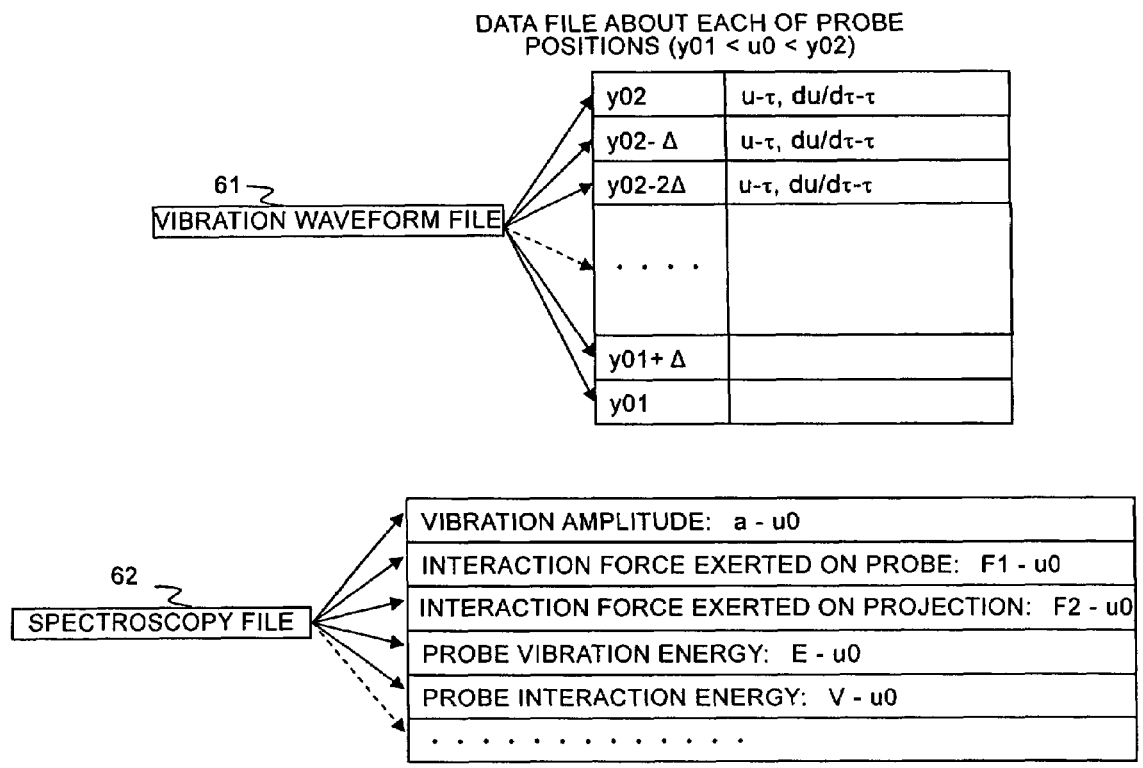
FIG. 4 is a structural diagram showing output data files.

FIG. 4 shows the structures of output data files of the present embodiment. Data files are output to an output folder in text format. The files are broadly classified as the vibration waveform file 61 and the spectroscopy file 62.

The vibration waveform file 61 further includes a data file about probe positions (y01 <u0 <y02). If the probe moves between the starting position y02 and the turnaround position y01 in increments Δ of 0.01 [nm], the probe displacement "u"–time "τ" relationship with respect to each u0 is recorded. This file also records the time derivative of displacement du/dτ with respect to the time "τ". In addition, the interaction force "F" and the time "τ" can be stored in association with each other. The vibration waveform file 61 shown in FIG. 4 is a data file of a probe moving from y02 to y01. The file can include both or either data of the lowering probe and the rising probe. When either is selected and rendered by animation, animated video showing the movement of the probe can be viewed.

The spectroscopy file 62 is a data file storing the amplitude "a", the interaction force "F1" (force exerted on the probe) and "F2" (force exerted on the projection), the probe vibration energy "E", the interaction force energy "V", and the like with respect to the initial probe position "u0", as a function of "u0". These data groups are important for analyzing the non-linear characteristics of the dynamic AFM.

(Operation of the Dynamic AFM Simulator)

Figure 5:
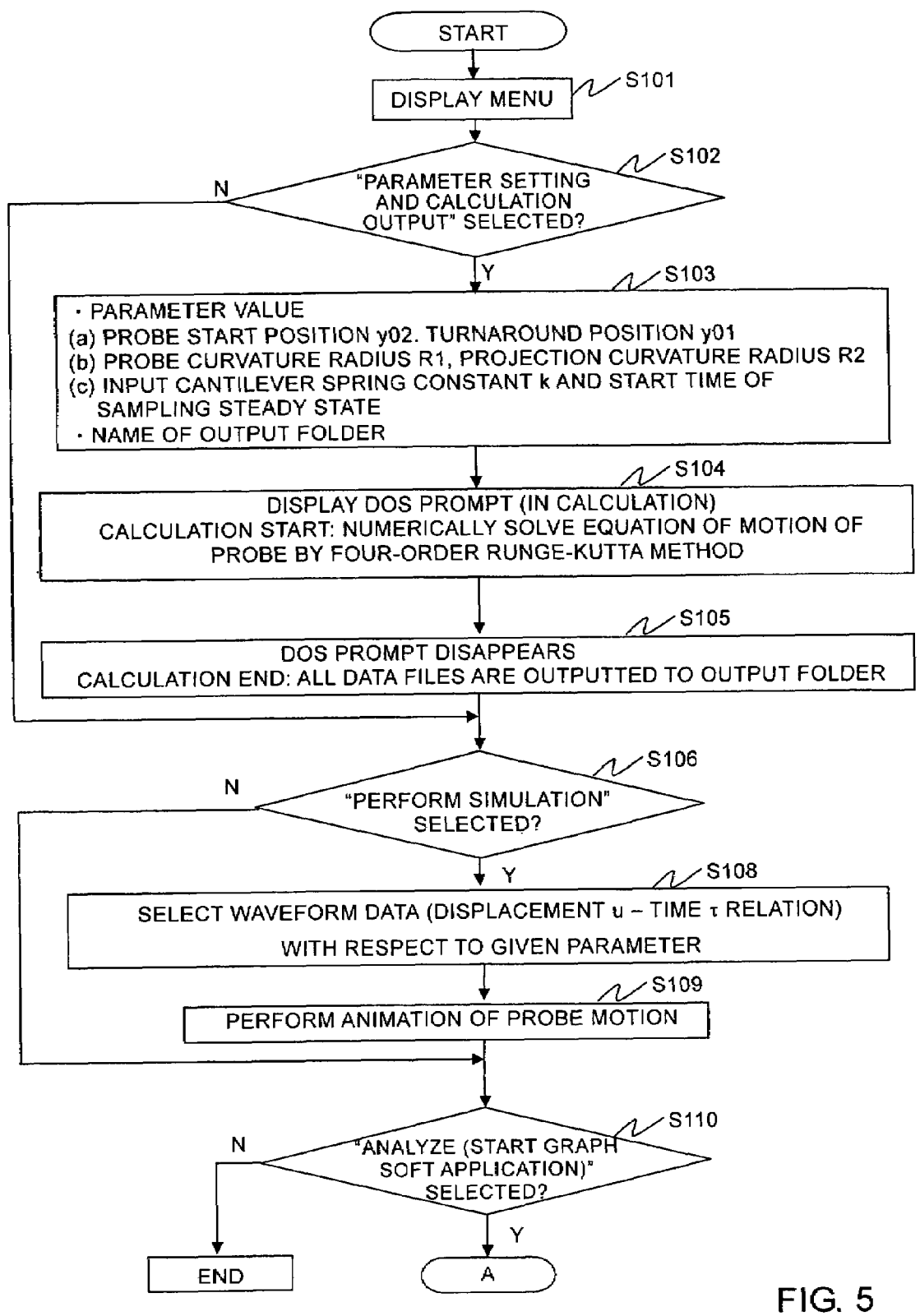
FIG. 5 is a flow chart (1) showing the processing of the dynamic AFM simulator.
Figure 6:
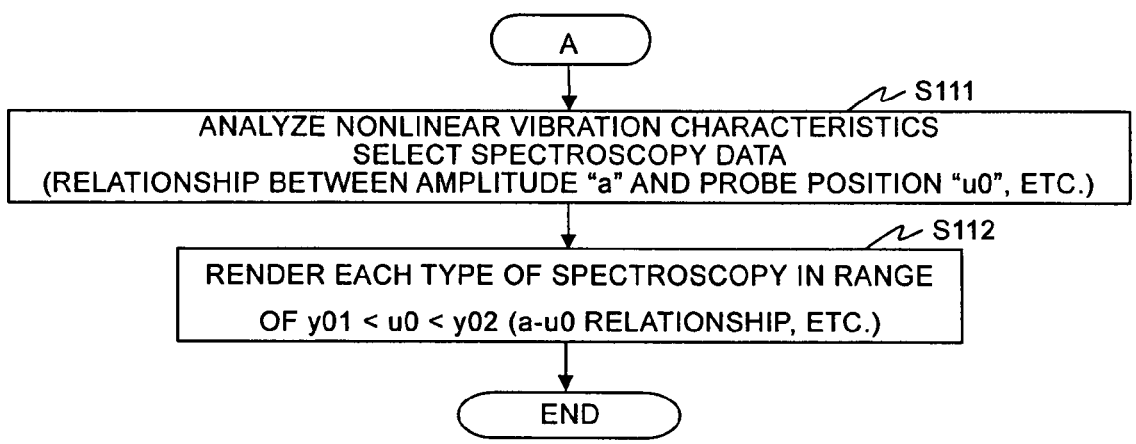
FIG. 6 is a flow chart (2) showing the processing of the dynamic AFM simulator.
Figure 9:
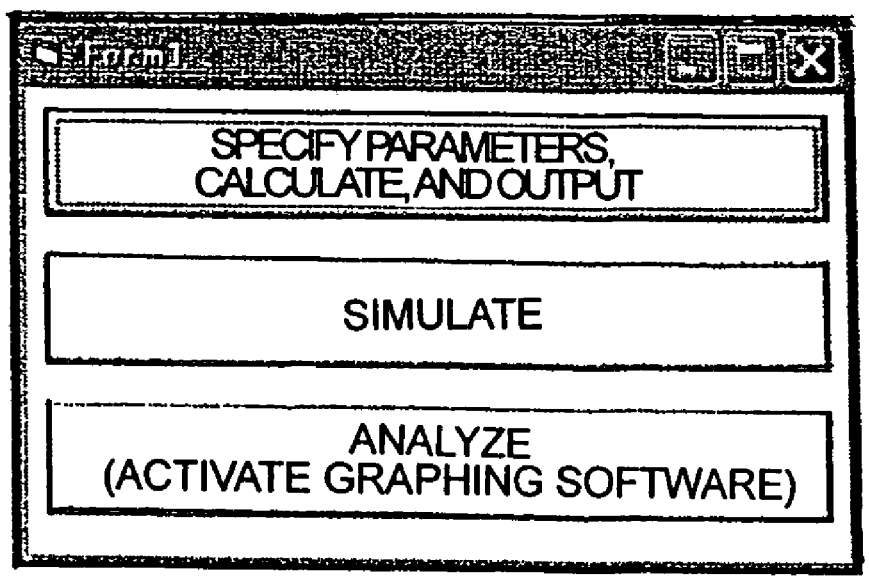
FIG. 9 shows an example of displayed menu items.

FIGS. 5 and 6 show flow charts (1) and (2) of the processing of the dynamic AFM simulator. FIGS. 9 to 15 show display examples of the dynamic AFM simulator. With reference to the flow charts (1) and (2) of the processing of the dynamic AFM simulator, specific operations of the simulator will be described. The CPU 1 displays menu items such as "SPECIFY PARAMETERS, CALCULATE, AND OUTPUT", "SIMULATE", and "ANALYZE (ACTIVATE GRAPHING SOFTWARE)" on the display device 5 by GUI (S101). FIG. 9 shows examples of displayed menu items. When the operator selects a desired item, the CPU 1 receives the selection input from the input device 4.

If there are no calculation data to be rendered by animation or to be analyzed, data must be created. For instance, when the operator selects "SPECIFY PARAMETERS, CALCULATE, AND OUTPUT" (S102), the processing of the CPU 1 goes to step S103. When another item is selected (S101), the processing of the CPU 1 goes to step S106. Steps S102, S106, and S110 may be parallel steps to be processed as selected by the operator under step S101.

In step S103, the CPU 1 displays a setting screen prompting parameter values necessary for calculation (S103). FIG. 10(a) shows an example of the parameter setting screen to be displayed. The CPU 1 receives (a) probe starting position "y02" and turnaround position "y01", (b) probe curvature radius "R1" and projection curvature radius "R2", and (c) cantilever spring constant "k" and steady-state sampling start time, from the input device 4. The CPU 1 may specify the probe starting position "y02" and the probe turnaround position "y01" by receiving the starting position and the turnaround position of the root of the cantilever and subtracting the probe diameter "2R1" from the received positions. The initial position "u0", the displacement "u", the velocity "du/dτ" may be defined as the values at the tip of the projection, and the equation of motion may be corrected accordingly.

When a data output folder name is input from the input device 4 (S103), the CPU 1 starts calculation, displaying the DOS prompt as shown in FIG. 10(b), for instance (S104). The folder name may not be input from the input device 4 and may be given by the CPU 1 under a predetermined rule of using a serial number, a date, or the like. In the calculation step, the equation (1) of motion of the probe is solved by a numerical integration method called a fourth-order Runge-Kutta method. During the calculation, the CPU 1 may display something other than the DOS prompt to indicate that the calculation is in progress or to indicate the course of the calculation or may display nothing. The equation of motion may be solved by an appropriate method other than the fourth-order Runge-Kutta method, such as a sixth-order Runge-Kutta method and Euler's method.

Figure 7:
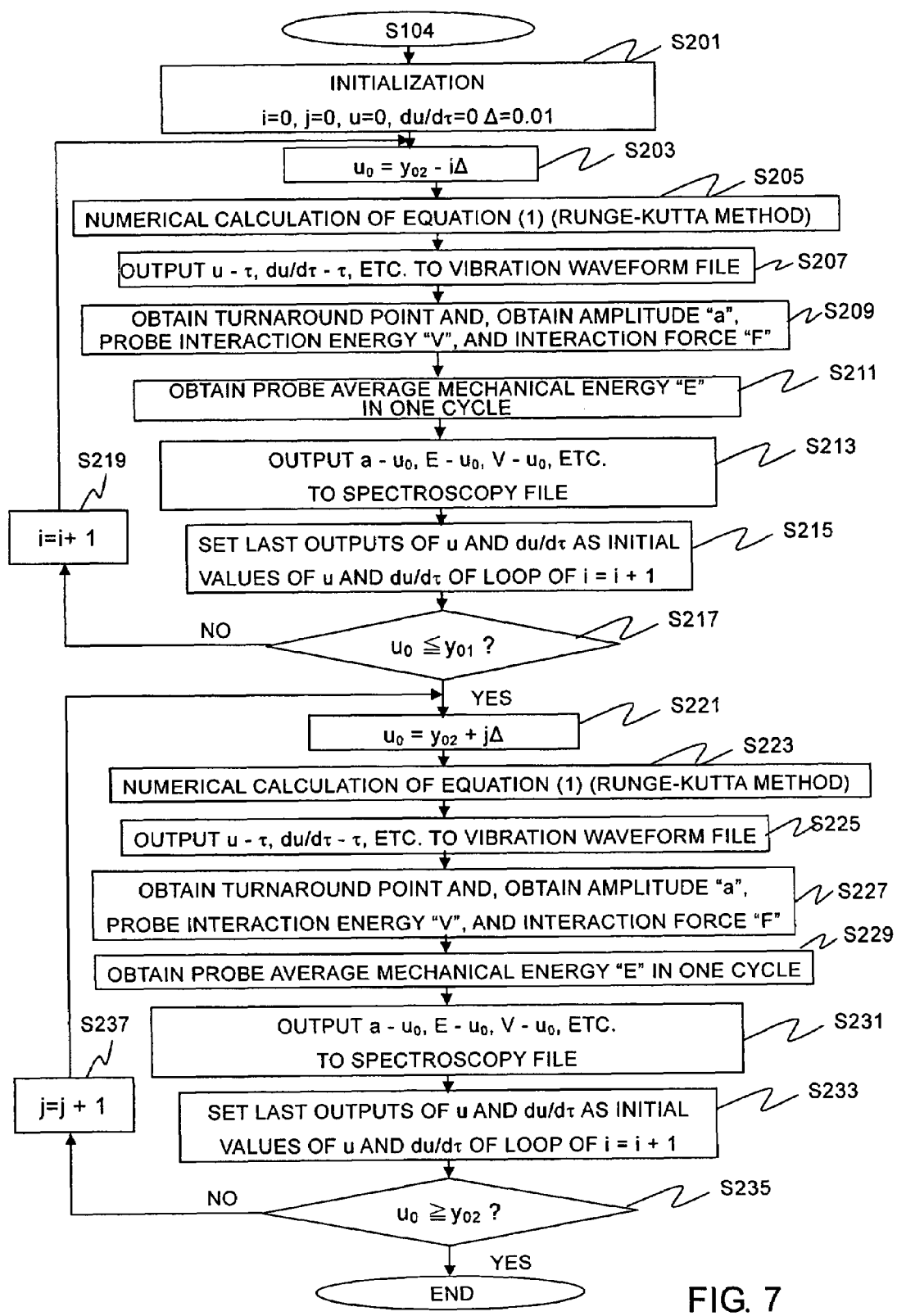
FIG. 7 is a flow chart showing details of step S104.

FIG. 7 is a flow chart showing details of step S104.

The CPU 1 performs initialization (S201). The CPU 1 specifies the initial probe displacement "u" to zero, the initial probe velocity "du/dτ" to 0, "i" is to 0, and "j" to 0, for instance. "i" and "j" are parameters for repeated calculation. The CPU 1 also specifies increments "Δ" of the movement of "u0" to 0.01. The value of the increments "Δ" can be specified to any other appropriate value.

The CPU 1 then specifies the initial probe position "u0" (S203). The CPU 1 specifies u0=y02−iΔ, for instance. When the calculation starts, i is 0. Therefore, the initial probe position "u0" equals the input starting position "y02".

The CPU 1 solves the equation (1) by the Runge-Kutta method with respect to the input parameters, the specified initial probe position "u0", and the initial values and obtains the probe displacement "u" at time "τ" and the probe velocity "du/dτ" (S205). The CPU 1 outputs (stores) the obtained probe displacement "u" and the time "τ" in association with each other (u–τ relationship) to the vibration waveform file 61 and outputs (stores) the probe velocity "du/dτ" and the time "τ" in association with each other (du/dτ–τ relationship) in the vibration waveform file 61 (S207). The u–τ relationship and the du/dτ–τ relationship are stored with respect to the initial probe position "u0" in the vibration waveform file 61. The CPU 1 may also output the probe displacement "u", the probe velocity "du/dτ", and the time "τ" with respect to a time "τ" greater than the input steady-state sampling start time to the vibration waveform file 61. The steady state may be determined from the obtained displacement "u" and the velocity "du/dτ", and "u", "du/dτ", and "τ" after the steady-state time may be output to the vibration waveform file 61.

The CPU 1 obtains the amplitude "a", the probe interaction energy "V", and the interaction force "F" from the corresponding displacement "u" to find a turnaround point (S209). The CPU 1 may obtain all of the amplitude "a", the probe interaction energy "V", and the interaction force "F" or may obtain one desired value or two or more desired values of them. The CPU 1 may obtain the maximum value "$u_{max}$" (corresponding to a displacement at the upper turnaround point) and the minimum value "$u_{min}$" (corresponding to a displacement at the lower turnaround point) of the obtained "u" and may obtain the amplitude "a" from the difference between the maximum value "$u_{max}$" and the minimum value "$u_{min}$". The CPU 1 also obtains the probe interaction energy "V" and the interaction force "F" at the lower turnaround point (or at a hit). The probe-surface interaction energy V at the turnaround point can be given by the following equation, for instance:

[Mathematical Expression 6]

$$V=V(R1, u+u0)+V(R2, u+u0-2R2) \quad (5)$$

where V(R, z) is the probe-surface interaction force, which is expressed by the following:

[Mathematical expression 7]

$$V(R, z) = \frac{2}{3}\pi^2 \rho^2 \varepsilon \sigma^5 R\left[\frac{1}{210}\left(\frac{\sigma}{z}\right)^7 - \frac{\sigma}{z}\right] \quad (6)$$

The interaction force between the probe and the surface can also be obtained by the following:

$$F=F(R1, u+u0)+F(R2, u+u0-2R2)$$

where F(R, z) is obtained by the equation (2).

The CPU 1 can obtain the upper turnaround point and the lower turnaround point of "u" by, for instance, finding a point (a combination of "τ" and "u") where "du/dτ" becomes approximately zero. The processing of step S209 will be described later in further detail.

The CPU 1 then obtains the average mechanical energy "E" of the probe in one cycle (S211). The CPU 1 obtains the average mechanical energy "E" by the following equation, for instance:

[Mathematical expression 8]

$$E = \frac{1}{T}\int_0^T \left(\frac{1}{2}m\dot{u}^2 + \frac{1}{2}ku^2 + V\right)d\tau \qquad (7)$$

where "E" is the average mechanical energy (nJ) of the probe in one cycle, "T" is the length of one cycle (dimensionless time), "u" is the probe displacement (nm) at time "τ", "τ" is increments of calculation time (dimensionless time), "m" is the mass (kg) of the standardized cantilever and probe, and "k" is the spring constant (N/m) of the cantilever. The length "T" of one cycle can be obtained by T=2×|$\tau_{max}$−$\tau_{min}$|, for instance. "$\tau_{max}$" is the time corresponding to the upper turn-around point of "u", and "$\tau_{min}$" is the time corresponding to the lower turnaround point of "u".

The CPU 1 outputs the amplitude "a" and initial probe position "u0" (a–u0), the average mechanical energy "E" and initial probe position "u0" (E–u0), and the interaction energy "V" and initial probe position "u0" (V–uo) to the corresponding spectroscopy files (S213). For instance, the CPU 1 adds the obtained amplitude "a" and the specified "u0" to the spectroscopy file 62 for storing the a–u0 relationship in association with each other. The initial probe position "u0" and the amplitude "a" specified in the repeated processing are stored successively to form a spectroscopy file of the relationship between the amplitude "a" and the initial probe position "u0". The average mechanical energy "E" and the interaction energy "V" are stored in the same way.

The CPU 1 uses the last outputs of the probe displacement "u" and the probe velocity "du/dτ" as the initial values of the probe displacement "u" and the probe velocity "du/dτ" for the processing in the loop of i=i+1 (S215). The last values (values at the last time, for instance) of the loop (i) becomes the initial values of the next loop (i+1). This setting corresponds to the procedure for lowering or raising the cantilever continuously. The displacement "u" and the velocity "du/dτ" at a predetermined time may be used instead of the last values of the loop (i).

The CPU 1 checks whether the specified initial probe position "u0" does not exceed the input turnaround position "y01" (u0≦y01) (S217). The CPU may check whether the initial probe position "u0" is smaller than the turnaround position "y01" (u0<y01). If the specified initial probe position "u0" is smaller than or equal to (or smaller than) the input turnaround position "y01" (S217), the CPU 1 goes to step S221. If the specified initial probe position "u0" is greater than (or greater than or equal to) the input turnaround position "y01" (S217), the CPU 1 increments the parameter "i" by one (i=i+1) and returns to step S203.

The processing above provides a result of simulation of the cantilever lowering from y02+2R1 to y01+2R1. The cantilever is moved upward and downward in the present embodiment. Just the upward movement or the downward movement can also be simulated. Then, the CPU 1 simulates the upward movement of the cantilever from y01+2R1 to y02+2R1.

The CPU 1 specifies the initial probe position "u0" (S221). The CPU 1 here specifies u0=y01+jΔ, for instance. Because j=0 at the beginning of the repeated processing, u0=y01. The CPU 1 may also specify a new initial probe position by adding an increment A to the specified initial probe position "u0".

The CPU 1 then executes the processing of steps S223 to S233. The processing of steps S223 to S233 is the same as the processing of steps S205 to S215, and the description is omitted.

The CPU 1 checks whether the specified initial probe position "u0" is greater than or equal to the input starting position "y02" (u0≧y02) (S235). The CPU 1 may check whether the initial probe position "u0" is greater than the starting position "y02" (u0>y01). If the specified initial probe position "u0" is greater than or equal to (or greater than) the starting position "y02" (S235), the CPU 1 ends the processing and goes to step S105, shown in FIG. 5. If the specified initial probe position "u0" is smaller than (or smaller than or equal to) the input starting position "y02" (S217), the CPU 1 increments the parameter "J" by one (j=j+1) (S237) and returns to step S221.

When the CPU 1 obtains the amplitude "a", the probe interaction energy "V", and the interaction force "V" from the corresponding displacement "u" (S209, S227) and the average mechanical energy "E" of the probe in one cycle (S211, S229) in seeking the turnaround point, the CPU 1 may read the data to be used from the output device (storage block) 6 or may hold the data to be used. The CPU 1 can read data necessary for processing from the output device (storage block) 6, when necessary.

Figure 8:
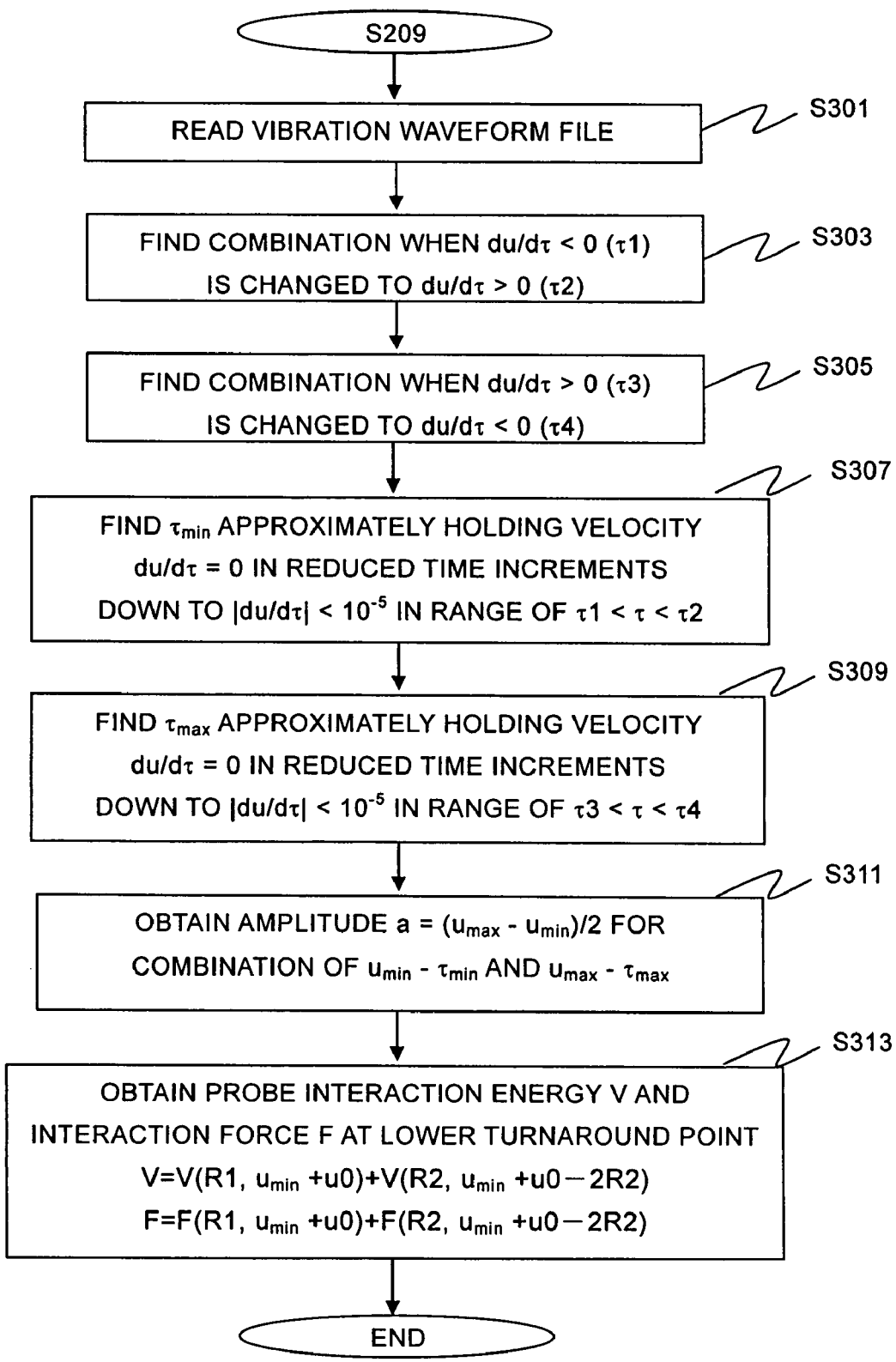
FIG. 8 is a flow chart showing details of step S209.

FIG. 8 is a flow chart showing details of step S209. Details of processing in step S209 will be described.

The CPU 1 reads a vibration waveform file (S301). With reference to the vibration waveform file, the CPU 1 searches for a group of time c when the probe velocity changes from negative (du/dτ<0) to positive (du/dτ>0) (S303). The CPU 1 specifies τ corresponding to du/dτ<0 as a first time τ1 and τ corresponding to du/dτ>0 as a second time τ2. τ2−τ1 corresponds an increment of time τ (S104). In the graph representing the u–τ relationship, τ1 and τ2 are on both sides of the lower turnaround point. With reference to the read vibration waveform file, the CPU 1 searches for a group of time τ when the probe velocity changes from positive (du/dτ>0) to negative (du/dτ<0) (S305). The CPU 1 specifies τ corresponding to du/dτ>0 as a third time τ3 and τ corresponding to du/dτ<0 as a fourth time τ4. In the graph representing the u–τ relationship, τ3 and τ4 are on both sides of the upper turnaround point. The CPU 1 can obtain at least one upper turnaround point and one lower turnaround point. The upper and lower turnaround points of each cycle can be obtained.

The CPU 1 searches for time $\tau_{min}$ of the lower turnaround point approximately holding velocity du/dτ=0 by reducing the time increments in the range of τ1<τ<τ2 until the absolute value of the probe velocity reaches or falls below a predetermined threshold (|du/dτ|<10⁻⁵, for instance) (S307). The CPU 1 also searches for time $\tau_{max}$ of the upper turnaround point approximately holding velocity du/dτ=0 by reducing the time increments in the range of τ3<τ<τ4 until the absolute value of the probe velocity reaches or falls below a predetermined threshold (|du/dτ|<10⁻⁵, for instance) (S309).

Figure 18:
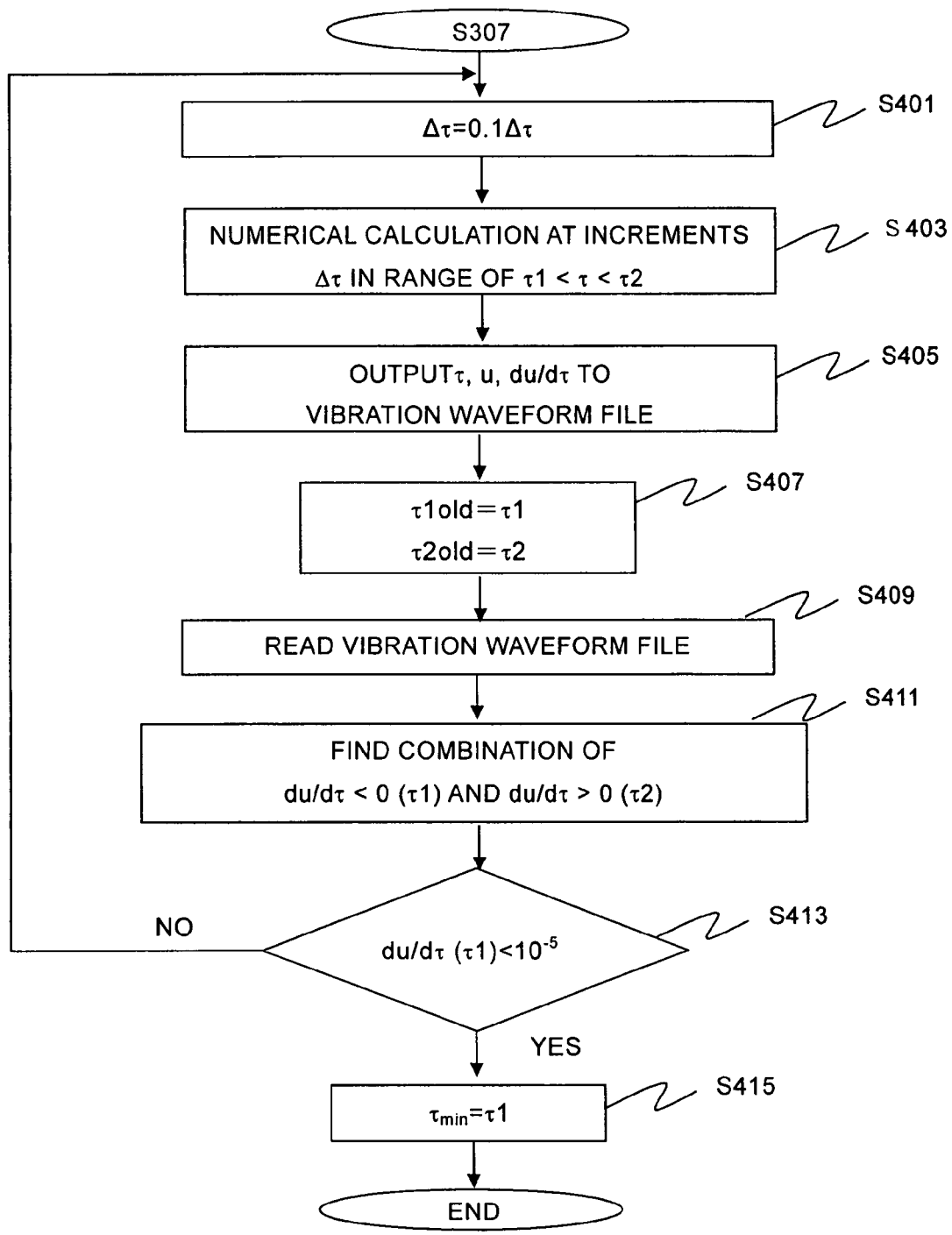
FIG. 18 is a flow chart showing details of step S307.

FIG. 18 is a flow chart showing details of step S307. More specifically, in step S307 shown in FIG. 8, the CPU 1 reduces the increment Δτ to one tenth, for instance, and performs mathematical calculation (Runge-Kutta method) again in the range of τ1<τ<τ2 (S401 to S407). The CPU 1 reads the vibration waveform file for this case and searches for a group of du/dτ<0 (τ1) and du/dτ>0 (τ2) (S409, S411). The CPU 1 obtains $\tau_{min}$=τ1 by repeating this processing until du/dτ (τ1) <10⁻⁵ is obtained (S413, S415). In step S309, $\tau_{max}$=τ3 is obtained in the same way.

Times $\tau_{max}$ and $\tau_{min}$ approximately holding velocity du/dτ=0 can be found on the basis of a value other than 10⁻⁵. The time approximately holding velocity du/dτ=0 here can be the time when the absolute value of the probe velocity becomes lower than or equal to (or lower than) a predetermined threshold ($|du/d\tau|<10^{-5}$) or the absolute value of the probe velocity is minimized.

In steps 303 and 305, the CPU 1 may roughly search for $\tau 1$ to $\tau 4$ in time increments greater than calculation increments used in the Runge-Kutta method in step S205, and may search for times $\tau_{max}$ and $\tau_{min}$ approximately holding velocity $du/d\tau=0$ in the ranges of $\tau 1$ to $\tau 2$ and $\tau 3$ to $\tau 4$ in smaller increments with reference to the vibration waveform file 61.

With reference to the vibration waveform file, the CPU 1 obtains a first probe displacement $u_{min}$ corresponding to the obtained time $\tau_{min}$ of the lower turnaround point and a second probe displacement $u_{max}$ corresponding to the obtained time $\tau_{max}$ of the upper turnaround point and determines the amplitude "a" (S311). The amplitude "a" can be obtained from the following equation, for instance:

$$a=(u_{max}-u_{min})/2$$

The CPU 1 also obtains the interaction force "F" and the interaction energy V of the probe at the lower turnaround point (at the hit) as follows (S313):

$$V=V(R1,u_{min}+u0)+V(R2,u_{min}+u0-2R2)$$

$$F=F(R1,u_{min}+u0)+F(R2,u_{min}+u0-2R2)$$

V(R, z) can be given by the equation (6), and F(R, z) can be given by the equation (2).

Back to FIG. 5, when the calculation ends, the CPU 1 erases the DOS prompt (S105). All data files have already been output to the output folder in text format.

Figure 11:
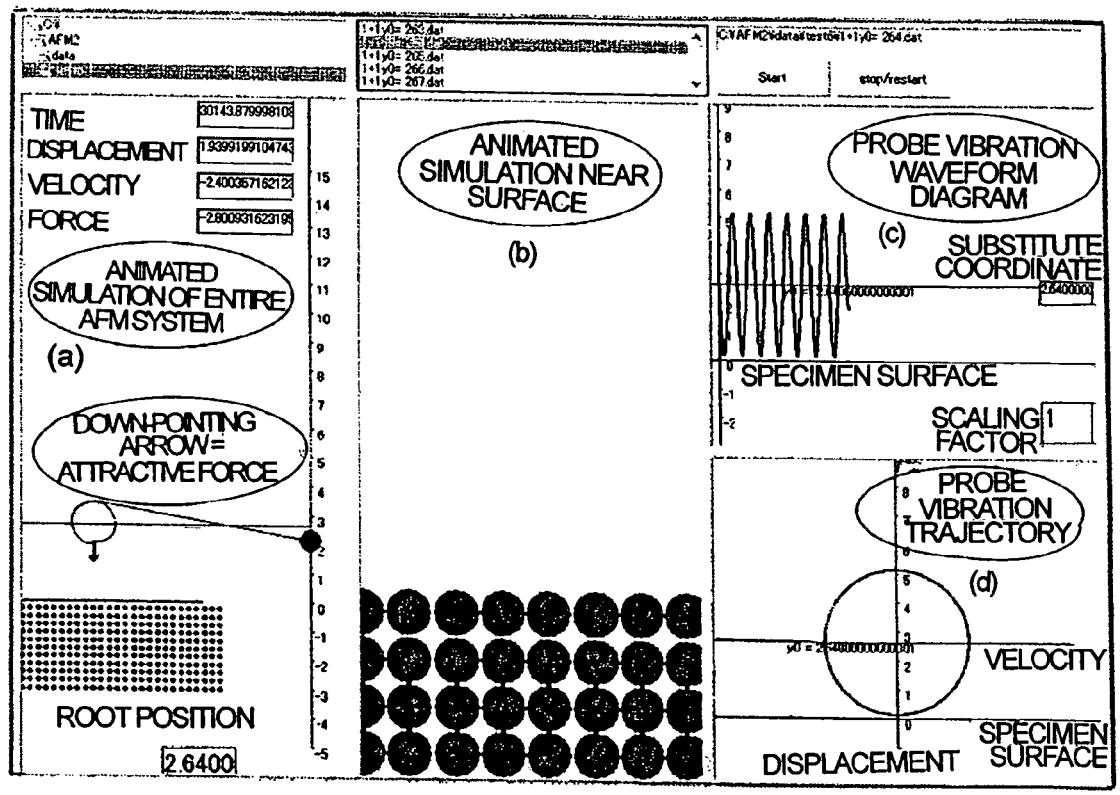
FIG. 11 shows an example (1) of animated video showing the motion of the probe.
Figure 12:
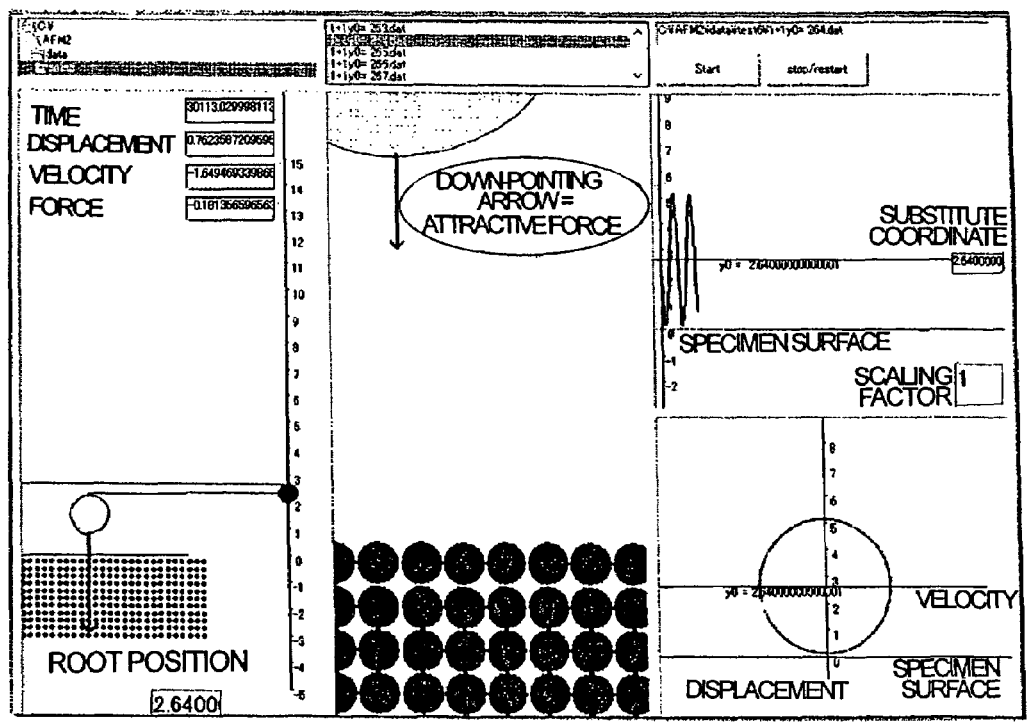
FIG. 12 shows an example (2) of animated video showing the motion of the probe.
Figure 13:
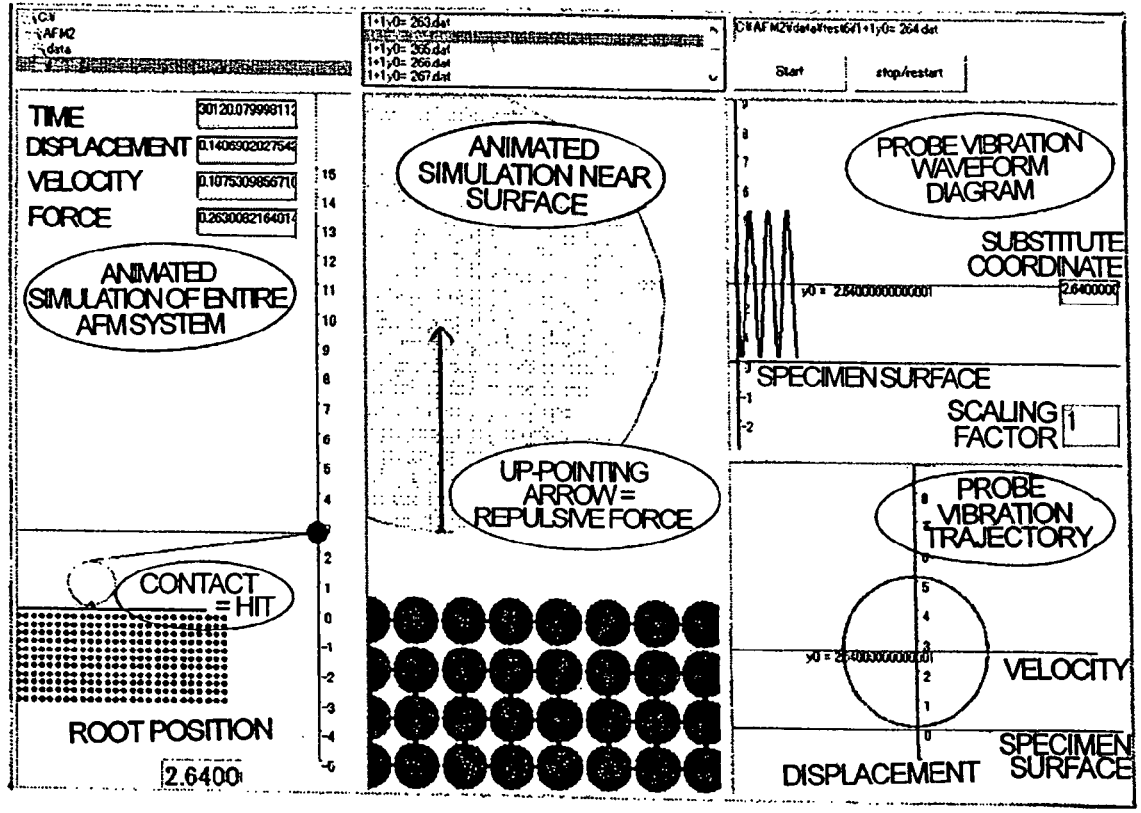
FIG. 13 shows an example (3) of animated video showing the motion of the probe.

Then, the CPU displays a menu (uses a displayed menu) and prompts to determine whether to view animated video of the probe motion or not. When "SIMULATE" is selected from the menu shown in FIG. 9 (S107), the CPU 1 goes to step S108. Otherwise, the processing goes to step S110. In step S108, the CPU 1 displays the file list of the output folder by GUI. When the operator selects waveform data (such as the relationship between probe position "u" and time "$\tau$") corresponding to a given probe position "u0" (y01<u0<y02) (S108), the CPU 1 renders the probe movement by animation on the basis of the selected waveform data by means of the input-output control block 3 (S109). The CPU 1 can read the selected waveform data or data to be displayed from the output device (storage block) 6 and can display animated video on the display block in accordance with the read waveform data. FIGS. 11, 12, and 13 show examples (1) to (3) of animated video showing the movement of the probe when the probe position "u0" is 2.64. The probe is very far from the surface in FIG. 11. In FIG. 12, the probe is approaching the surface a little. The probe is in contact with the surface (hits the surface) in FIG. 13. In any screen, animated video of the entire dynamic AFM system is shown in the left pane (a), and magnified animated video of an area near the surface is shown in the center pane (b).

In the center pane (b), the vertical down-pointing arrow (FIG. 12) represents the attracting force acting between the probe and the specimen surface, and the vertical up-pointing arrow (FIG. 13) represents the repulsive force. The CPU 1 can display the arrow having a length corresponding to the magnitude of the obtained interaction force F in the direction corresponding to the sign of the interaction force F. Accordingly, whether the probe and the surface are in contact with each other in nano-scale can be readily seen, and that is one of the greatest advantages of the simulator. FIG. 11 shows a noncontact state, and a down-pointing arrow appears in the left pane (a) (an attracting force is exerted), and the center pane (b) shows that the probe is not approaching the surface. In FIG. 13 showing a contact state, the left pane (a) shows an up-pointing arrow (a repulsive force is exerted), and the center pane (b) shows that the probe is approaching the surface. The characteristics of the hit can be checked on the atom level, and that is one characteristic of the simulator.

Figure 14:
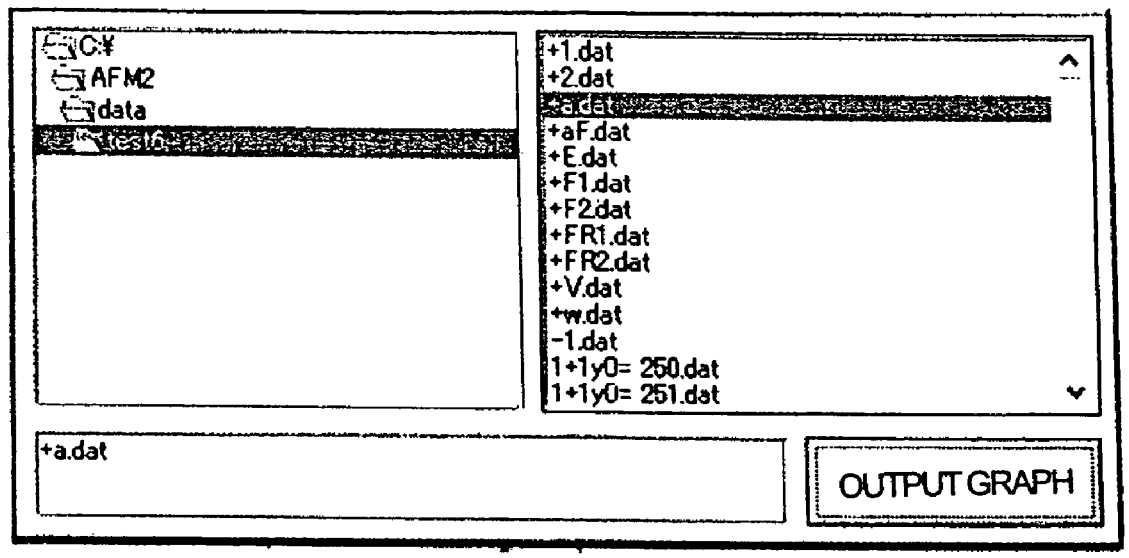
FIG. 14 shows an example of a data file list.
Figure 15:
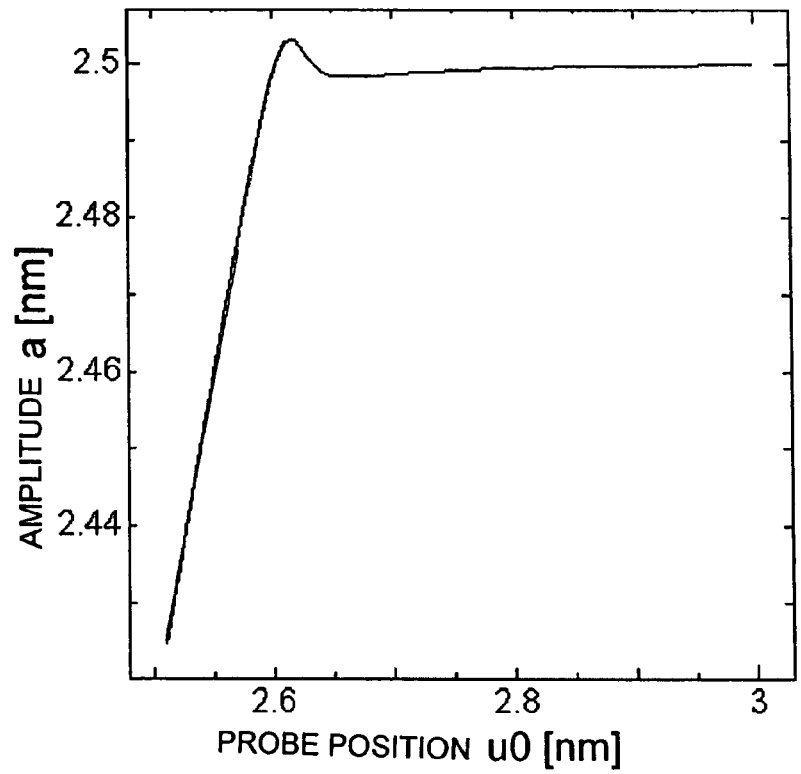
FIG. 15 shows an example of vibration spectroscopy rendering the amplitude "a" as a function of a probe position "u0".

The CPU 1 can render the waveform of the probe vibration (relationship between the displacement "u" and the time "$\tau$") in the upper half (c) of the right pane and the trajectory (relationship between the displacement "u" and the velocity "$du/d\tau$") in the phase space in the lower half (d), in synchronization with the animated video. This makes it possible to understand the characteristics of the vibration at a glance. FIGS. 9 to 12 show panes (a) to (d) displayed in one screen. One or a plurality of panes may also be displayed. When ANALYZE (ACTIVATE GRAPHING SOFTWARE) is selected from the menu shown in FIG. 9 in order to perform nonlinear analysis of calculated data (S110), the processing of the CPU 1 goes to step S111. Otherwise, the processing ends, for instance. In step S111, a data file list is displayed by GUI, as shown in FIG. 14. When the operator selects spectroscopy data (such as data indicating the relationship between "a" and "u0") (S111), the CPU 1 renders spectroscopy in the range of y01<u0<y02 in accordance with data selected by given graphing software (S112). For instance, the CPU 1 can read the selected data or data to be displayed from the output device (storage block) 6 and display spectroscopy based on the read data in the display block. FIG. 15 shows an example of spectroscopy of amplitude obtained when rendering the amplitude "a" as a function of the probe position "u0".

2. Second Embodiment

In the first embodiment described above, the probe has a projection, but the probe may not have a projection. A probe without projection will be described below.

The hardware structure, parameters used, and output data file structure can be the same as those of the first embodiment.

FIG. 16 is a system block diagram of a dynamic AFM without a projection. FIG. 16(a) is a view illustrating the positional relationship among the cantilever, the probe, and the surface system and the definition of the probe position "u0". FIG. 16(b) is a view illustrating the definition of the probe displacement "u" and the interaction force between the probe and the surface. FIG. 16(c) shows a dynamic AFM drive mode. Those figures of FIG. 16 differ from those of FIG. 2 in that the projection is eliminated.

When the initial position of the probe tip when the cantilever is not expanding nor contracting is specified as "u0", the base of the cantilever can be expressed as u0+2R1. Then, the base of the cantilever can be expressed as u0+2R1. When the cantilever mechanically produces resonance with an amplitude of "1" centering on the base, the equation of motion of the probe can be expressed as a second-order nonlinear ordinary differential equation about time "$\tau$".

[Mathematical expression 9]

$$\ddot{u} + \frac{1}{Q}\dot{u} + u - \frac{1}{k}F(R1, u+u0) = l\cos\tau \quad (11)$$

$$F(R, z) = \frac{2}{3}\pi^2\rho^2\varepsilon\sigma^4 R\left[\frac{1}{30}\left(\frac{\sigma}{z}\right)^8 - \left(\frac{\sigma}{z}\right)^2\right] \quad (12)$$

As shown in FIG. 16(b), the displacement of the probe from the initial probe position "u0" when the cantilever is not expanding nor contracting is expressed as u=z−u0. FIG. 16(b) shows the probe moved from the initial position "u0" by the displacement "u". "z" is the probe position at time "τ", or z(τ). F(R, z) is the van der Waals force acting on the tip of the spherical probe having a curvature radius "R". The Q value, the spring constant, and the excited amplitude of the cantilever are expressed as "Q", "k", and "l" respectively. The atom number density in the probe and the surface, a parameter related to the atom radius, and a parameter related to the binding energy of the atom are denoted by "ρ", "σ" and "ε" respectively.

A specific operation of the simulator will be described.

The flow chart of the simulator can be the same as in the first embodiment. For instance, the input of curvature radius "R2" can be omitted, and the item of "R2" can be considered to be zero in the calculation. The specific operation of the simulator will be described with reference to the flow chart in the first embodiment.

Steps S101 and 102 in FIG. 5 are the same as in the first embodiment. In step S103, the CPU 1 displays a setting screen for prompting parameter values necessary for the calculation (S103'). The parameter setting screen displayed here can be the same as that shown in FIG. 10(a), but the curvature radius "R2" of the projection can be omitted. The CPU 1 receives (a) the probe starting position "y02" and the turnaround position "y01", (b) the curvature radius "R1" of the probe, and (c) the spring constant "k" and the steady-state sampling start time from the input device 4. When a data output folder name is input from the input device 4 (S103), the CPU 1 executes the processing of step S104.

In the flow chart of FIG. 7 showing details of step S104, steps S210 and S203 are the same as in the first embodiment. The CPU 1 solves the equation (11) by the Runge-Kutta method, for instance, in accordance with the input parameters and the specified initial probe position "u0", and obtains the probe displacement "u" and the probe velocity "du/dτ" at the time τ (S205'). Step S207 is the same as in the first embodiment.

The CPU 1 then seeks the turnaround point by obtaining the displacement "a", the probe interaction energy "V", and the interaction force "F" from the corresponding displacement "u" (S209'). The CPU 1 may obtain all of the displacement "a", the probe interaction energy "V", and the interaction force "F" or may obtain one desired value or two or more desired values of them. The CPU 1 obtains the maximum value "$u_{max}$" and the minimum value "$u_{min}$" of the obtained "u" and obtains the amplitude "a" from the difference between the maximum value "$u_{max}$" and the minimum value "$u_{min}$". The CPU 1 also obtains the probe interaction energy "V" and the interaction force "F" at the lower turnaround point (or at a hit). The probe-surface interaction energy V at the turnaround point can be given by the following equation, for instance:

[Mathematical Expression 10]

$$V=V(R1,u+u0) \quad (15)$$

where V(R, z) is the probe-surface interaction force and is expressed as follows:

[Mathematical expression 11]

$$V(R, z) = \frac{2}{3}\pi^2\rho^2\varepsilon\sigma^5 R\left[\frac{1}{210}\left(\frac{\sigma}{z}\right)^7 - \frac{\sigma}{z}\right] \quad (6)$$

The interaction force F can be given by the following equation:

$$F=F(R1,u+u0)$$

where F(R, z) can be given by the equation (2) of the first embodiment. The CPU 1 can also obtain the maximum value and the minimum value of the probe displacement "u" by finding a point (a combination of "τ" and "u") where the probe velocity "du/dτ" becomes approximately zero. The processing of step S209' will be described later in further detail. Steps S211 to S237 are the same as in the first embodiment.

In the flow chart of FIG. 8 showing details of step S209, steps S301 to S311 are as described above. The CPU 1 obtains the interaction energy "V" and the interaction force "F" of the probe at the lower turnaround point (at a hit) by the following equation (S313'):

$$V=V(R1,u_{min}+u0)$$

where V(R, z) is given by the equation (6):

$$F=F(R1,u_{min}+u0)$$

where F(R, z) is given by the equation (2).

Steps S105 and subsequent steps in FIG. 5 are the same as in the first embodiment.

3. Data Analysis and Examination

FIG. 17 shows examples of numerical calculation in cases where a projection is provided and a projection is not provided.

The probe vibration amplitude "a" in the steady state was calculated with the probe position "u0" being varied. The relationship between the absence of the projection (FIG. 17(a)) and the presence of the projection (FIG. 17(b)) was obtained. In each figure, the down curve (solid line) was plotted when the probe was lowered toward the surface, and the up curve (broken line) was plotted when the probe was raised from the surface. Hysteresis was exhibited around the boundary between the non-contact state and the contact state. The hysteresis was small when there was a projection. With this simulator, the effect of a projection in the dynamic AFM can be examined. It has been found that the projection reduces the hysteresis. The reduced hysteresis would stabilize the operation of the dynamic AFM and improve the resolution.

4. Supplementary Note

A dynamic-mode atomic-force-microscope probe vibration simulation method according to the present invention can be provided by a dynamic-mode atomic-force-microscope probe vibration simulation program for executing the simulation procedure on a computer, a computer-readable recording medium having recorded the dynamic-mode atomic-force-microscope probe vibration simulation program, a program product which includes the program and can be loaded into an internal memory of a computer, a computer such as a server including the program, or the like.

INDUSTRIAL APPLICABILITY

The present invention can be applied to industries related to scanning probe microscopes in nanotechnology, for instance.

The invention claimed is:

1. A dynamic-mode atomic-force-microscope probe vibration simulation method for simulating vibration characteristics of a probe of a dynamic-mode atomic force microscope for observing the structure of a surface of a specimen by bringing a cantilever having a probe with a projection at the cantilever end closer to and/or far from the surface of the specimen while producing resonance mechanically, the dynamic-mode atomic-force-microscope probe vibration simulation method comprising:

a step in which a processing block inputs a starting position and a turnaround position of the approach and/or leaving of the cantilever, the curvature radius of the probe, the curvature radius of the projection of the probe, and the spring constant of the cantilever, from an input block;

a step in which the processing block specifies an initial displacement with respect to an initial probe position and an initial probe velocity;

a step in which the processing block sets the initial probe position to the input starting position;

a step in which the processing block solves the following equation of motion of the probe when the non-probe side of the cantilever is vibrated, in accordance with the set initial probe position, the specified probe displacement, the specified initial velocity, and the input probe curvature radius, the input projection curvature radius, and the input cantilever spring constant, to obtain the probe displacement and the probe velocity at each time;

[Mathematical expression 1]

$$\ddot{u} + \frac{1}{Q}\dot{u} + u - \frac{1}{k}F(R1, u+u0) - \frac{1}{k}F(R2, u+u0-2R2) = l\cos\tau \quad (1)$$

$$F(R, z) = \frac{2}{3}\pi^2\rho^2\varepsilon\sigma^4 R\left[\frac{1}{30}\left(\frac{\sigma}{z}\right)^8 - \left(\frac{\sigma}{z}\right)^2\right] \quad (2)$$

[where "u" is the displacement of the probe from the initial probe position "u0" when the cantilever is not expanding nor contracting; "τ" is a time; "z" is the probe position z(τ) at the time "τ"; F(R, z) is the van der Waals force or interaction force acting on the projection or the tip of the spherical probe having the curvature radius "R"; "Q" is the Q value of the cantilever; "k" is the spring constant; "l" is the excited amplitude; "ρ" is the atom number density in the probe and the surface; "σ" is a parameter related to the radius of an atom; "ε" is a parameter related to the binding energy of the atom; "R1" is the curvature radius of the probe; "R2" is the curvature radius of the projection; and "u0" is the initial probe position]

a step in which the processing block stores the obtained probe displacement and time corresponding with each other in a storage block with respect to the initial probe position and stores the probe velocity and time corresponding with each other in the storage block with respect to the initial probe position;

a step in which the processing block sets an initial probe displacement and an initial probe velocity in subsequent repeated processing to the values of the probe displacement and the probe velocity obtained at the last time in the step in which the processing block solves the equation of motion to obtain the probe displacement and the probe velocity or to values at a predetermined time; and a step in which, until the value of the set initial probe position becomes smaller than or equal to the value of the input turnaround position or smaller than the value of the input turnaround position, the processing block repeatedly (a) specifies a new initial probe position by subtracting a predetermined cantilever movement increment from the input starting position successively or subtracting the movement increment from the set initial probe position and (b) executes the steps from the step in which the processing block solves the equation of motion to obtain the probe displacement and the probe velocity to the step in which the processing block sets an initial probe displacement and an initial probe velocity to the values at the last time or at a predetermined time, with respect to the newly specified initial probe position.

2. A dynamic-mode atomic-force-microscope probe vibration simulation method for simulating vibration characteristics of a probe of a dynamic-mode atomic force microscope for observing the structure of a surface of a specimen by bringing a cantilever having a probe at the cantilever end closer to and/or far from the surface of the specimen while producing resonance mechanically, the dynamic-mode atomic-force-microscope probe vibration simulation method comprising:

a step in which a processing block inputs a starting position and a turnaround position of the approach and/or leaving of the cantilever, the curvature radius of the probe, and the spring constant of the cantilever, from an input block;

a step in which the processing block specifies an initial displacement with respect to an initial probe position and an initial probe velocity;

a step in which the processing block sets the initial probe position to the input starting position;

a step in which the processing block solves the following equation of motion of the probe when the non-probe side of the cantilever is vibrated, in accordance with the set initial probe position, the specified probe displacement, the specified initial velocity, and the input probe curvature radius, and the input cantilever spring constant, to obtain the probe displacement and the probe velocity at each time;

[Mathematical expression 2]

$$\ddot{u} + \frac{1}{Q}\dot{u} + u - \frac{1}{k}F(R1, u+u0) = l\cos\tau \quad (11)$$

$$F(R, z) = \frac{2}{3}\pi^2\rho^2\varepsilon\sigma^4 R\left[\frac{1}{30}\left(\frac{\sigma}{z}\right)^8 - \left(\frac{\sigma}{z}\right)^2\right] \quad (12)$$

[where "u" is the displacement of the probe from the initial probe position "u0" when the cantilever is not expanding nor contracting; "τ" is a time; "z" is the probe position z(τ) at the time "τ"; F(R, z) is the van der Waals force acting on the tip of the spherical probe having the curvature radius "R"; "Q" is the Q value of the cantilever; "k" is the spring constant; "l" is the excited amplitude; "ρ" is the atom number density in the probe and the surface; "σ" is a parameter related to the radius of an atom; "ε" is a parameter related to the binding energy of the atom; "R1" is the curvature radius of the probe; and "u0" is the initial probe position]

a step in which the processing block stores the obtained probe displacement and time corresponding with each other in a storage block with respect to the initial probe position and stores the probe velocity and time corresponding with each other in the storage block with respect to the initial probe position;

a step in which the processing block sets an initial probe displacement and an initial probe velocity in subsequent repeated processing to the values of the probe displacement and the probe velocity obtained at the last time in the step in which the processing block solves the equation of motion to obtain the probe displacement and the probe velocity or to values at a predetermined time; and a step in which, until the value of the set initial probe position becomes smaller than or equal to the value of the input turnaround position or smaller than the value of the input turnaround position, the processing block repeatedly (a) specifies a new initial probe position by subtracting a predetermined cantilever movement increment from the input starting position successively or subtracting the movement increment from the set initial probe position and (b) executes the steps from the step in which the processing block solves the equation of motion to obtain the probe displacement and the probe velocity to the step in which the processing block sets an initial probe displacement and an initial probe velocity to the values at the last time or at a predetermined time, with respect to the newly specified initial probe position.

3. A dynamic-mode atomic-force-microscope probe vibration simulation method according to one of claims 1 and 2, further comprising:
a step in which, until the value of the set initial probe position becomes greater than or equal to the value of the input starting position or greater than the value of the input starting position, the processing block repeatedly (c) specifies a new initial probe position by adding a movement increment to the input turnaround position or adding the movement increment to the set initial probe position and (d) executes the steps which include the step in which the processing block solves the equation of motion to obtain the probe displacement and the probe velocity to the step in which the processing block sets an initial probe displacement and an initial probe velocity to the values at the last time or at a predetermined time, with respect to the newly specified initial probe position.

4. A dynamic-mode atomic-force-microscope probe vibration simulation method according to one of claims 1 and 2, further comprising:
a step in which the processing block obtains one or plurality of a probe displacement amplitude, interaction energy between the probe and the specimen surface, interaction force between the probe and the specimen surface, and average mechanical energy of the probe, in accordance with the obtained probe displacement; and
a step in which the processing block stores one or plurality of the obtained amplitude, interaction energy, interaction force, and average mechanical energy of the probe in the storage block in association with the set initial probe position.

5. A dynamic-mode atomic-force-microscope probe vibration simulation method according to one of claims 1 and 2, further comprising:
a step in which the processing block obtains at least one upper turnaround point and one lower turnaround point of the probe displacement in accordance with the obtained probe velocity or displacement;
a step in which the difference between the probe displacements corresponding to the obtained upper turnaround point and lower turnaround point is obtained to determine the amplitude of the probe displacement; and
a step in which the processing block stores the obtained amplitude in the storage block in association with the set initial probe position.

6. A dynamic-mode atomic-force-microscope probe vibration simulation method according to claim 1, further comprising:
a step in which the processing block obtains interaction energy "V" between the probe and projection, and the specimen surface, in accordance with the equations below; and
a step in which the processing block stores the obtained interaction energy "V" in the storage block in association with the set initial probe position

[Mathematical expression 3]

$$V = V(R1, u+u0) + V(R2, u+u0-2R2) \tag{5}$$

$$V(R, z) = \frac{2}{3}\pi^2\rho^2\varepsilon\sigma^5 R\left[\frac{1}{210}\left(\frac{\sigma}{z}\right)^7 - \frac{\sigma}{z}\right] \tag{6}$$

where "ρ" is the atom number density in the probe and the surface; "σ" is a parameter related to the radius of an atom; "ε" is a parameter related to the binding energy of the atom; "R1" is the curvature radius of the probe; "R2" is the curvature radius of the projection; and "u0" is the initial probe position.

7. A dynamic-mode atomic-force-microscope probe vibration simulation method according to claim 1, further comprising:
a step in which the processing block obtains interaction force "F" between the probe and projection, and the specimen surface in accordance with the equations below; and
a step in which the processing block stores the obtained interaction force "F" in the storage block in association with the set initial probe position

[Mathematical expression 4]

$$F = F(R1, u+u0) + F(R2, u+u0-2R2) \tag{2}$$

$$F(R, z) = \frac{2}{3}\pi^2\rho^2\varepsilon\sigma^4 R\left[\frac{1}{30}\left(\frac{\sigma}{z}\right)^8 - \left(\frac{\sigma}{z}\right)^2\right]$$

where "ρ" is the atom number density in the probe and the surface; "σ" is a parameter related to the radius of an atom; "ε" is a parameter related to the binding energy of the atom; "R1" is the curvature radius of the probe; "R2" is the curvature radius of the projection; and "u0" is the initial probe position.

8. A dynamic-mode atomic-force-microscope probe vibration simulation method according to one of claims 1 and 2, further comprising:
a step in which the processing block obtains average mechanical energy "E" of the probe in one cycle in accordance with the equation given below; and
a step in which the processing block stores the obtained average mechanical energy "E" in the storage block in association with the set initial probe position

[Mathematical expression 5]

$$E = \frac{1}{T}\int_0^T \left(\frac{1}{2}m\dot{u}^2 + \frac{1}{2}ku^2 + V\right)d\tau \tag{7}$$

where "E" is the average mechanical energy (nJ) of the probe in one cycle; "T" is the length of one cycle (dimensionless time); "u" is the probe displacement (nm) at time "τ"; "τ" is a calculation time increment (dimensionless time); "m" is the mass 1 (kg) of the standardized cantilever and probe; and "k" is the spring constant (N/m) of the cantilever.

9. A dynamic-mode atomic-force-microscope probe vibration simulation method according to one of claims 1 and 2, further comprising:
a step in which the processing block obtains, when the obtained probe velocity changes from a negative probe velocity to a positive probe velocity, a combination of a first time corresponding the negative probe velocity and a second time corresponding to the positive probe velocity;

a step in which the processing block obtains, when the obtained probe velocity changes from a positive probe velocity to a negative probe velocity, a combination of a third time corresponding the positive probe velocity and a fourth time corresponding to the negative probe velocity;

a step in which the processing block obtains a time at a lower turnaround point when the absolute value of the probe velocity becomes smaller than or equal to a predetermined threshold or is minimized by reducing a time increment until the absolute value of the probe velocity becomes smaller than or equal to the predetermined threshold between the obtained first time and second time;

a step in which the processing block obtains a time at an upper turnaround point when the absolute value of the probe velocity becomes smaller than or equal to a predetermined threshold or is minimized by reducing the time increment until the absolute value of the probe velocity becomes smaller than or equal to the predetermined threshold between the obtained third time and fourth time;

a step in which the processing block reads a first probe displacement corresponding to the obtained time at the lower turnaround point and a second probe displacement corresponding to the obtained time at the upper turnaround point, from the probe displacements and times stored in association with each other in the storage block;

a step in which the processing block obtains one or plurality of the difference between the read first probe displacement and the read second probe displacement to determine the amplitude of the probe displacement, interaction energy between the probe and the specimen surface at the lower turnaround point in accordance with the first probe displacement, and probe interaction force at the lower turnaround point in accordance with the first probe displacement; and a step in which the processing block stores one or plurality of the obtained amplitude, the obtained interaction energy, and the obtained interaction force in the storage block.

10. A dynamic-mode atomic-force-microscope probe vibration simulation method according to claim 9, comprising:

a step in which the processing block obtains one or plurality of the probe displacement amplitude "a", the interaction energy "V" between the probe and the specimen surface at the lower turnaround point, and the interaction force "F" of the probe at the lower turnaround point, in accordance with both or one of the obtained first probe displacement and the obtained second probe displacement, as given by the equations below

[Mathematical expression 6]

Amplitude $a = (u_{max} - u_{min})/2$ $V = V(R1, u_{min} + u0) + V(R2, u_{min} + u0 - 2R2)$ -continued $$V(R, z) = \frac{2}{3}\pi^2\rho^2\varepsilon\sigma^5 R\left[\frac{1}{210}\left(\frac{\sigma}{z}\right)^7 - \frac{\sigma}{z}\right] \quad (6)$$

$F = F(R1, u_{min} + u0) + F(R2, u_{min} + u0 - 2R2)$ $$F(R, z) = \frac{2}{3}\pi^2\rho^2\varepsilon\sigma^4 R\left[\frac{1}{30}\left(\frac{\sigma}{z}\right)^8 - \left(\frac{\sigma}{z}\right)^2\right] \quad (2)$$

where "$u_{min}$" is the first probe displacement; "$u_{max}$" is the second probe displacement; "ρ" is the atom number density in the probe and the surface; "σ" is the parameter related to the radius of the atom; "ε" is the parameter related to the binding energy of the atom; "R1" is the curvature radius of the probe; "R2" is the curvature radius of the projection; and "u0" is the initial probe position.

11. A dynamic-mode atomic-force-microscope probe vibration simulation method according to one of claims 1 and 2, further comprising:

a step in which the processing block reads a stored time, the probe displacement corresponding to the time, and the probe velocity corresponding to the time, from the storage block; and a step in which the probe motion or the probe motion near the specimen surface is rendered by animation on a display block, in accordance with the read probe displacement and the read probe velocity.

12. A dynamic-mode atomic-force-microscope probe vibration simulation method according to claim 11, further comprising:

a step in which the processing block reads the interaction force "F" which was obtained and stored when the equation of motion was solved, from the storage block; and a step in which an arrow having a length corresponding to the magnitude of the read interaction force "F" and a direction corresponding to the sign of the interaction force "F" is displayed on the animation of the probe surface on the display block.

13. A dynamic-mode atomic-force-microscope probe vibration simulation method according to one of claims 1 and 2, further comprising:

a step in which the processing block reads a stored time and a stored probe displacement from the storage block; and a step in which the read time and probe displacement are graphically displayed on a display block.

14. A dynamic-mode atomic-force-microscope probe vibration simulation method according to one of claims 1 and 2, further comprising:

a step in which the processing block reads a stored probe velocity and the corresponding probe displacement from the storage block; and a step in which a trajectory in the phase plane is displayed on a display block by plotting the read probe velocity and the corresponding probe displacement.

15. A dynamic-mode atomic-force-microscope probe vibration simulation method according to claim 4, further comprising:

a step in which the processing block reads one or plurality of combinations of the stored probe displacement amplitude and initial probe position, the stored interaction energy and initial probe position, the stored interaction force and initial probe position, and the stored average mechanical energy and initial probe position, from the storage block; and a step of displaying a spectroscopy of the read one or plurality of combinations on a display block.

16. A non-transitory computer readable medium containing computer instructions stored therein for causing a computer processor to perform a dynamic-mode atomic-force-microscope probe vibration simulation program for simulating vibration characteristics of a dynamic-mode atomic force microscope for observing the structure of a surface of a specimen by bringing a cantilever having a probe with a projection at the cantilever end closer to and/or far from the surface of the specimen while producing resonance mechanically, the dynamic-mode atomic-force-microscope probe vibration simulation program causes a computer to execute:

a step in which a processing block inputs a starting position and a turnaround position of the approach and/or leaving of the cantilever, the curvature radius of the probe, the curvature radius of the projection of the probe, and the spring constant of the cantilever, from an input block;

a step in which the processing block specifies an initial displacement with respect to an initial probe position and an initial probe velocity;

a step in which the processing block sets the initial probe position to the input starting position;

a step in which the processing block solves the following equation of motion of the probe when the non-probe side of the cantilever is vibrated, in accordance with the set initial probe position, the specified probe displacement, the specified initial velocity, and the input probe curvature radius, the input projection curvature radius, and the input cantilever spring constant, to obtain the probe displacement and the probe velocity at each time;

[Mathematical expression 7]

$$\ddot{u} + \frac{1}{Q}\dot{u} + u - \frac{1}{k}F(R1, u+u0) - \frac{1}{k}F(R2, u+u0-2R2) = l\cos\tau \quad (1)$$

$$F(R, z) = \frac{2}{3}\pi^2 \rho^2 \varepsilon \sigma^4 R\left[\frac{1}{30}\left(\frac{\sigma}{z}\right)^8 - \left(\frac{\sigma}{z}\right)^2\right] \quad (2)$$

[where "u" is the displacement of the probe from the initial probe position "u0" when the cantilever is not expanding nor contracting; "τ" is a time; "z" is the probe position z(τ) at the time "τ"; F(R, z) is the van der Waals force or interaction force acting on the projection or the tip of the spherical probe having the curvature radius "R"; "Q" is the Q value of the cantilever; "k" is the spring constant; "l" is the excited amplitude; "ρ" is the atom number density in the probe and the surface; "σ" is a parameter related to the radius of an atom; "ε" is a parameter related to the binding energy of the atom; "R1" is the curvature radius of the probe; "R2" is the curvature radius of the projection; and "u0" is the initial probe position]

a step in which the processing block stores the obtained probe displacement and time corresponding with each other in a storage block with respect to the initial probe position and stores the probe velocity and time corresponding with each other in the storage block with respect to the initial probe position;

a step in which the processing block sets an initial probe displacement and an initial probe velocity in subsequent repeated processing to the values of the probe displacement and the probe velocity obtained at the last time in the step in which the processing block solves the equation of motion to obtain the probe displacement and the probe velocity or to values at a predetermined time; and a step in which, until the value of the set initial probe position becomes smaller than or equal to the value of the input turnaround position or smaller than the value of the input turnaround position, the processing block repeatedly (a) specifies a new initial probe position by subtracting a predetermined cantilever movement increment from the input starting position successively or subtracting the movement increment from the set initial probe position and (b) executes the steps from the step in which the processing block solves the equation of motion to obtain the probe displacement and the probe velocity to the step in which the processing block sets an initial probe displacement and an initial probe velocity to the values at the last time or at a predetermined time, with respect to the newly specified initial probe position.

17. A non-transitory computer readable medium containing computer instructions stored therin for causing a computer processor to perform a dynamic-mode atomic-force-microscope probe vibration simulation program for simulating vibration characteristics of a dynamic-mode atomic force microscope for observing the structure of a surface of a specimen by bringing a cantilever having a probe at the cantilever end closer to and/or far from the surface of the specimen while producing resonance mechanically, the dynamic-mode atomic-force-microscope probe vibration simulation program causes a computer to execute:

a step in which a processing block inputs a starting position and a turnaround position of the approach and/or leaving of the cantilever, the curvature radius of the probe, and the spring constant of the cantilever, from an input block;

a step in which the processing block specifies an initial displacement with respect to an initial probe position and an initial probe velocity;

a step in which the processing block sets the initial probe position to the input starting position;

a step in which the processing block solves the following equation of motion of the probe when the non-probe side of the cantilever is vibrated, in accordance with the set initial probe position, the specified probe displacement, the specified initial velocity, and the input probe curvature radius, and the input cantilever spring constant, to obtain the probe displacement and the probe velocity at each time;

[Mathematical expression 8]

$$\ddot{u} + \frac{1}{Q}\dot{u} + u - \frac{1}{k}F(R1, u+u0) = l\cos\tau \quad (11)$$

$$F(R, z) = \frac{2}{3}\pi^2 \rho^2 \varepsilon \sigma^4 R\left[\frac{1}{30}\left(\frac{\sigma}{z}\right)^8 - \left(\frac{\sigma}{z}\right)^2\right] \quad (12)$$

[where "u" is the displacement of the probe from the initial probe position "u0" when the cantilever is not expanding nor contracting; "τ" is a time; "z" is the probe position z(τ) at the time "τ"; F(R, z) is the van der Waals force acting on the tip of the spherical probe having the curvature radius "R"; "Q" is the Q value of the cantilever; "k" is the spring constant; "l" is the excited amplitude; "ρ" is the atom number density in the probe and the surface; "σ" is a parameter related to the radius of an atom; "ε" is a parameter related to the binding energy of the atom; "R1" is the curvature radius of the probe; and "u0" is the initial probe position]

a step in which the processing block stores the obtained probe displacement and time corresponding with each other in a storage block with respect to the initial probe position and stores the probe velocity and time corresponding with each other in the storage block with respect to the initial probe position;

a step in which the processing block sets an initial probe displacement and an initial probe velocity in subsequent repeated processing to the values of the probe displacement and the probe velocity obtained at the last time in the step in which the processing block solves the equation of motion to obtain the probe displacement and the probe velocity or to values at a predetermined time; and a step in which, until the value of the set initial probe position becomes smaller than or equal to the value of the input turnaround position or smaller than the value of the input turnaround position, the processing block repeatedly (a) specifies a new initial probe position by subtracting a predetermined cantilever movement increment from the input starting position successively or subtracting the movement increment from the set initial probe position and (b) executes the steps from the step in which the processing block solves the equation of motion to obtain the probe displacement and the probe velocity to the step in which the processing block sets an initial probe displacement and an initial probe velocity to the values at the last time or at a predetermined time, with respect to the newly specified initial probe position.

18. A computer readable recording medium recording a dynamic-mode atomic-force-microscope probe vibration simulation program for simulating vibration characteristics of a dynamic-mode atomic force microscope for observing the structure of a surface of a specimen by bringing a cantilever having a probe with a projection at the cantilever end closer to and/or far from the surface of the specimen while producing resonance mechanically, the dynamic-mode atomic-force-microscope probe vibration simulation program causes a computer to execute:

a step in which a processing block inputs a starting position and a turnaround position of the approach and/or leaving of the cantilever, the curvature radius of the probe, the curvature radius of the projection of the probe, and the spring constant of the cantilever, from an input block;

a step in which the processing block specifies an initial displacement with respect to an initial probe position and an initial probe velocity;

a step in which the processing block sets the initial probe position to the input starting position;

a step in which the processing block solves the following equation of motion of the probe when the non-probe side of the cantilever is vibrated, in accordance with the set initial probe position, the specified probe displacement, the specified initial velocity, and the input probe curvature radius, the input projection curvature radius, and the input cantilever spring constant, to obtain the probe displacement and the probe velocity at each time;

[Mathematical expression 9]

$$\ddot{u} + \frac{1}{Q}\dot{u} + u - \frac{1}{k}F(R1, u+u0) - \frac{1}{k}F(R2, u+u0 - 2R2) = l\cos\tau \quad (1)$$

$$F(R, z) = \frac{2}{3}\pi^2 \rho^2 \varepsilon \sigma^4 R \left[\frac{1}{30}\left(\frac{\sigma}{z}\right)^8 - \left(\frac{\sigma}{z}\right)^2\right] \quad (2)$$

[where "u" is the displacement of the probe from the initial probe position "u0" when the cantilever is not expanding nor contracting; "τ" is a time; "z" is the probe position z(τ) at the time "τ"; F(R, z) is the van der Waals force or interaction force acting on the projection or the tip of the spherical probe having the curvature radius "R"; "Q" is the Q value of the cantilever; "k" is the spring constant; "l" is the excited amplitude; "ρ" is the atom number density in the probe and the surface; "σ" is a parameter related to the radius of an atom; "ε" is a parameter related to the binding energy of the atom; "R1" is the curvature radius of the probe; "R2" is the curvature radius of the projection; and "u0" is the initial probe position]

a step in which the processing block stores the obtained probe displacement and time corresponding with each other in a storage block with respect to the initial probe position and stores the probe velocity and time corresponding with each other in the storage block with respect to the initial probe position;

a step in which the processing block sets an initial probe displacement and an initial probe velocity in subsequent repeated processing to the values of the probe displacement and the probe velocity obtained at the last time in the step in which the processing block solves the equation of motion to obtain the probe displacement and the probe velocity or to values at a predetermined time; and a step in which, until the value of the set initial probe position becomes smaller than or equal to the value of the input turnaround position or smaller than the value of the input turnaround position, the processing block repeatedly (a) specifies a new initial probe position by subtracting a predetermined cantilever movement increment from the input starting position successively or subtracting the movement increment from the set initial probe position and (b) executes the steps from the step in which the processing block solves the equation of motion to obtain the probe displacement and the probe velocity to the step in which the processing block sets an initial probe displacement and an initial probe velocity to the values at the last time or at a predetermined time, with respect to the newly specified initial probe position.

19. A computer readable recording medium recording a dynamic-mode atomic-force-microscope probe vibration simulation program for simulating vibration characteristics of a dynamic-mode atomic force microscope for observing the structure of a surface of a specimen by bringing a cantilever having a probe at the cantilever end closer to and/or far from the surface of the specimen while producing resonance mechanically, the dynamic-mode atomic-force-microscope probe vibration simulation program causes a computer to execute:

a step in which a processing block inputs a starting position and a turnaround position of the approach and/or leaving of the cantilever, the curvature radius of the probe, and the spring constant of the cantilever, from an input block;

a step in which the processing block specifies an initial displacement with respect to an initial probe position and an initial probe velocity;

a step in which the processing block sets the initial probe position to the input starting position;

a step in which the processing block solves the following equation of motion of the probe when the non-probe side of the cantilever is vibrated, in accordance with the set initial probe position, the specified probe displacement, the specified initial velocity, and the input probe curvature radius, and the input cantilever spring constant, to obtain the probe displacement and the probe velocity at each time;

[Mathematical expression 10]

$$\ddot{u} + \frac{1}{Q}\dot{u} + u - \frac{1}{k}F(R1, u+u0) = l\cos\tau \quad (11)$$

$$F(R, z) = \frac{2}{3}\pi^2\rho^2\varepsilon\sigma^4 R\left[\frac{1}{30}\left(\frac{\sigma}{z}\right)^8 - \left(\frac{\sigma}{z}\right)^2\right] \quad (12)$$

[where "u" is the displacement of the probe from the initial probe position "u0" when the cantilever is not expanding nor contracting; "τ" is a time; "z" is the probe position z(τ) at the time "τ"; F(R, z) is the van der Waals force acting on the tip of the spherical probe having the curvature radius "R"; "Q" is the Q value of the cantilever; "k" is the spring constant; "l" is the excited amplitude; "ρ" is the atom number density in the probe and the surface; "σ" is a parameter related to the radius of an atom; "ε" is a parameter related to the binding energy of the atom; "R1" is the curvature radius of the probe; and "u0" is the initial probe position]

a step in which the processing block stores the obtained probe displacement and time corresponding with each other in a storage block with respect to the initial probe position and stores the probe velocity and time corresponding with each other in the storage block with respect to the initial probe position;

a step in which the processing block sets an initial probe displacement and an initial probe velocity in subsequent repeated processing to the values of the probe displacement and the probe velocity obtained at the last time in the step in which the processing block solves the equation of motion to obtain the probe displacement and the probe velocity or to values at a predetermined time; and a step in which, until the value of the set initial probe position becomes smaller than or equal to the value of the input turnaround position or smaller than the value of the input turnaround position, the processing block repeatedly (a) specifies a new initial probe position by subtracting a predetermined cantilever movement increment from the input starting position successively or subtracting the movement increment from the set initial probe position and (b) executes the steps from the step in which the processing block solves the equation of motion to obtain the probe displacement and the probe velocity to the step in which the processing block sets an initial probe displacement and an initial probe velocity to the values at the last time or at a predetermined time, with respect to the newly specified initial probe position.

20. A dynamic-mode atomic-force-microscope probe vibration simulator for simulating vibration characteristics of a dynamic-mode atomic force microscope for observing the structure of a surface of a specimen by bringing a cantilever having a probe with a projection at the cantilever end closer to and/or far from the surface of the specimen while producing resonance mechanically, the dynamic-mode atomic-force-microscope probe vibration simulator comprising:

an input block for inputting parameters;

a processing block for simulating vibration characteristics of a dynamic-mode atomic force microscope in accordance with the parameters which are input from the input block; and, a storage or output block for storing or displaying data obtained by the processing block, wherein the processing block has a means for inputting a starting position and a turnaround position of the approach and/or leaving of the cantilever, the curvature radius of the probe, the curvature radius of the projection of the probe, and the spring constant of the cantilever, from the input block;

a means for specifying an initial displacement with respect to an initial probe position and an initial probe velocity;

a means for setting the initial probe position to the input starting position;

a means for solving the following equation of motion of the probe when the non-probe side of the cantilever is vibrated, in accordance with the set initial probe position, the specified probe displacement, the specified initial velocity, and the input probe curvature radius, the input projection curvature radius, and the input cantilever spring constant, to obtain the probe displacement and the probe velocity at each time;

[Mathematical expression 11]

$$\ddot{u} + \frac{1}{Q}\dot{u} + u - \frac{1}{k}F(R1, u+u0) - \frac{1}{k}F(R2, u+u0-2R2) = l\cos\tau \quad (1)$$

$$F(R, z) = \frac{2}{3}\pi^2\rho^2\varepsilon\sigma^4 R\left[\frac{1}{30}\left(\frac{\sigma}{z}\right)^8 - \left(\frac{\sigma}{z}\right)^2\right] \quad (2)$$

[where "u" is the displacement of the probe from the initial probe position "u0" when the cantilever is not expanding nor contracting; "τ" is a time; "z" is the probe position z(τ) at the time "τ"; F(R, z) is the van der Waals force or interaction force acting on the projection or the tip of the spherical probe having the curvature radius "R"; "Q" is the Q value of the cantilever; "k" is the spring constant; "l" is the excited amplitude; "ρ" is the atom number density in the probe and the surface; "σ" is a parameter related to the radius of an atom; "ε" is a parameter related to the binding energy of the atom; "R1" is the curvature radius of the probe; "R2" is the curvature radius of the projection; and "u0" is the initial probe position]

a means for storing the obtained probe displacement and time corresponding with each other in the storage or output block with respect to the initial probe position and storing the probe velocity and time corresponding with each other in the storage or output block with respect to the initial probe position;

a means for setting an initial probe displacement and an initial probe velocity in subsequent repeated processing to the values of the probe displacement and the probe velocity obtained at the last time in the means for solving the equation of motion to obtain the probe displacement and the probe velocity or to values at a predetermined time; and a means for, until the value of the set initial probe position becomes smaller than or equal to the value of the input turnaround position or smaller than the value of the input turnaround position, repeatedly (a) specifying a new initial probe position by subtracting a predetermined cantilever movement increment from the input starting position successively or subtracting the movement increment from the set initial probe position and (b) executes the means from the means for solving the equation of motion to obtain the probe displacement and the probe velocity to the means for setting an initial probe displacement and an initial probe velocity to the values at the last time or at a predetermined time, with respect to the newly specified initial probe position.

21. A dynamic-mode atomic-force-microscope probe vibration simulator for simulating vibration characteristics of a dynamic-mode atomic force microscope for observing the structure of a surface of a specimen by bringing a cantilever having a probe at the cantilever end closer to and/or far from the surface of the specimen while producing resonance mechanically, the dynamic-mode atomic-force-microscope probe vibration simulator comprising:

an input block for inputting parameters;

a processing block for simulating vibration characteristics of a dynamic-mode atomic force microscope in accordance with the parameters which are input from the input block; and, a storage or output block for storing or displaying data obtained by the processing block, wherein the processing block has a means for inputting a starting position and a turnaround position of the approach and/or leaving of the cantilever, the curvature radius of the probe, and the spring constant of the cantilever, from the input block;

a step means for specifying an initial displacement with respect to an initial probe position and an initial probe velocity;

a step means for setting the initial probe position to the input starting position;

a step means for solving the following equation of motion of the probe when the non-probe side of the cantilever is vibrated, in accordance with the set initial probe position, the specified probe displacement, the specified initial velocity, and the input probe curvature radius, and the input cantilever spring constant, to obtain the probe displacement and the probe velocity at each time;

[Mathematical expression 12]

$$\ddot{u} + \frac{1}{Q}\dot{u} + u - \frac{1}{k}F(R1, u + u0) = l\cos\tau \quad (11)$$

$$F(R, z) = \frac{2}{3}\pi^2 \rho^2 \varepsilon \sigma^4 R \left[ \frac{1}{30}\left(\frac{\sigma}{z}\right)^8 - \left(\frac{\sigma}{z}\right)^2 \right] \quad (12)$$

[where "u" is the displacement of the probe from the initial probe position "u0" when the cantilever is not expanding nor contracting; "τ" is a time; "z" is the probe position z(τ) at the time "τ"; F(R, z) is the van der Waals force acting on the tip of the spherical probe having the curvature radius "R"; "Q" is the Q value of the cantilever; "k" is the spring constant; "l" is the excited amplitude; "ρ" is the atom number density in the probe and the surface; "σ" is a parameter related to the radius of an atom; "ε" is a parameter related to the binding energy of the atom; "R1" is the curvature radius of the probe; and "u0" is the initial probe position]

a means for storing the obtained probe displacement and time corresponding with each other in the storage or output block with respect to the initial probe position and storing the probe velocity and time corresponding with each other in the storage or output block with respect to the initial probe position;

a means for setting an initial probe displacement and an initial probe velocity in subsequent repeated processing to the values of the probe displacement and the probe velocity obtained at the last time in the means for solving the equation of motion to obtain the probe displacement and the probe velocity or to values at a predetermined time; and a means for, until the value of the set initial probe position becomes smaller than or equal to the value of the input turnaround position or smaller than the value of the input turnaround position, repeatedly (a) specifying a new initial probe position by subtracting a predetermined cantilever movement increment from the input starting position successively or subtracting the movement increment from the set initial probe position and (b) executes the means from the means for solving the equation of motion to obtain the probe displacement and the probe velocity to the means for setting an initial probe displacement and an initial probe velocity to the values at the last time or at a predetermined time, with respect to the newly specified initial probe position.

\* \* \* \* \*